United States Patent
Itou et al.

(10) Patent No.: US 11,151,775 B2
(45) Date of Patent: Oct. 19, 2021

(54) IMAGE PROCESSING APPARATUS, DISPLAY SYSTEM, COMPUTER READABLE RECORING MEDIUM, AND IMAGE PROCESSING METHOD

(71) Applicant: TOYOTA JIDOSHA KABUSHIKI KAISHA, Toyota (JP)

(72) Inventors: Kazuhiro Itou, Mishima (JP); Hitoshi Kumon, Aichi-gun (JP); Kotomi Teshima, Gotemba (JP); Yoshie Mikami, Mishima (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/112,035

(22) Filed: Dec. 4, 2020

(65) Prior Publication Data

US 2021/0174573 A1 Jun. 10, 2021

(30) Foreign Application Priority Data

Dec. 6, 2019 (JP) .............................. JP2019-221695

(51) Int. Cl.
*G06T 15/20* (2011.01)
*G10L 15/22* (2006.01)

(52) U.S. Cl.
CPC .............. *G06T 15/20* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 2006/0050070 A1 | 3/2006 | Matsui | |
| 2010/0020185 A1 | 1/2010 | Sako et al. | |
| 2011/0234369 A1 | 9/2011 | Cai et al. | |
| 2013/0194304 A1* | 8/2013 | Latta | G09G 3/003 345/633 |
| 2016/0330410 A1 | 11/2016 | Sako et al. | |
| 2018/0020191 A1 | 1/2018 | Sako et al. | |
| 2019/0121515 A1 | 4/2019 | Nashida | |
| 2019/0155024 A1* | 5/2019 | Tsutsumi | B60K 37/06 |

(Continued)

FOREIGN PATENT DOCUMENTS

| | | |
|---|---|---|
| JP | 2004-129180 A | 4/2004 |
| JP | 2006-107437 A | 4/2006 |

(Continued)

*Primary Examiner* — Frank S Chen
(74) *Attorney, Agent, or Firm* — Oblon, McClelland, Maier & Neustadt, L.L.P.

(57) ABSTRACT

An image processing apparatus includes a processor including hardware. The processor is configured to: generate a first virtual image when one wearer of a first wearer wearing a first wearable device configured to communicate with the processor and a second wearer wearing a second wearable device configured to communicate with the processor rides in a moving body and another wearer virtually rides in the moving body, the first virtual image reflecting a behavior of the other wearer and representing a state where the other wearer virtually rides in the moving body as observed from a viewpoint of the one wearer, the first virtual image; and output the generated first virtual image to the first or the second wearable device worn by the one wearer.

21 Claims, 20 Drawing Sheets

(56) References Cited

U.S. PATENT DOCUMENTS

| | | | |
|---|---|---|---|
| 2019/0279371 A1* | 9/2019 | Usikov | G06K 9/6288 |
| 2020/0090541 A1* | 3/2020 | Klein | G09B 9/003 |
| 2021/0174573 A1* | 6/2021 | Itou | G06T 15/20 |

FOREIGN PATENT DOCUMENTS

| | | |
|---|---|---|
| JP | 2008-154192 A | 7/2008 |
| JP | 2013-521571 A | 6/2013 |
| JP | 2016-034087 A | 3/2016 |
| JP | 6323505 B2 | 5/2018 |
| JP | 2018-112486 A | 7/2018 |
| WO | WO 2017/064926 A1 | 4/2017 |

* cited by examiner ered by the designated imaging device is displayed on a display device worn by the user.

IMAGE PROCESSING APPARATUS, DISPLAY SYSTEM, COMPUTER READABLE RECORDING MEDIUM, AND IMAGE PROCESSING METHOD

The present application claims priority to and incorporates by reference the entire contents of Japanese Patent Application No. 2019-221695 filed in Japan on Dec. 6, 2019.

BACKGROUND

The present disclosure relates to an image processing apparatus, a display system, a computer readable recording medium, and an image processing method.

There is a known technique that allows a user to arbitrarily view a scene viewable from the person other than the user (for example, refer to JP 2008-154192 A). Using this technique, a desired imaging device is designated from a plurality of imaging devices attached to each of moving bodies such as other people and automobiles, and an image corresponding to image data obtained by the designated imaging device is displayed on a display device worn by the user.

SUMMARY

The technique in JP 2008-154192 A described above merely provides a situation in which one user is viewing a scene captured by the imaging device mounted on another moving body. Therefore, the technique of JP 2008-154192 A described above has a difficulty in giving the user a view of the appearance of the other user in an attempt to share the same scene with the other user. This lacks a sense of unity with the other user and lacks the excitement as obtained in the real world.

There is a need for an image processing apparatus, a display system, a computer readable recording medium, and an image processing method that may provide a sense of unity among users.

According to one aspect of the present disclosure, there is provided an image processing apparatus including a processor including hardware, the processor being configured to: generate a first virtual image when one wearer of a first wearer wearing a first wearable device configured to communicate with the processor and a second wearer wearing a second wearable device configured to communicate with the processor rides in a moving body and another wearer virtually rides in the moving body, the first virtual image reflecting a behavior of the other wearer and representing a state where the other wearer virtually rides in the moving body as observed from a viewpoint of the one wearer, the first virtual image; and output the generated first virtual image to the first or the second wearable device worn by the one wearer.

DETAILED DESCRIPTION

Hereinbelow, embodiments of the present disclosure will be described in detail with reference to the drawings. Note that the present disclosure is not limited to the following embodiments. In the following description, identical components are labeled with the same reference signs.

Figure 1:
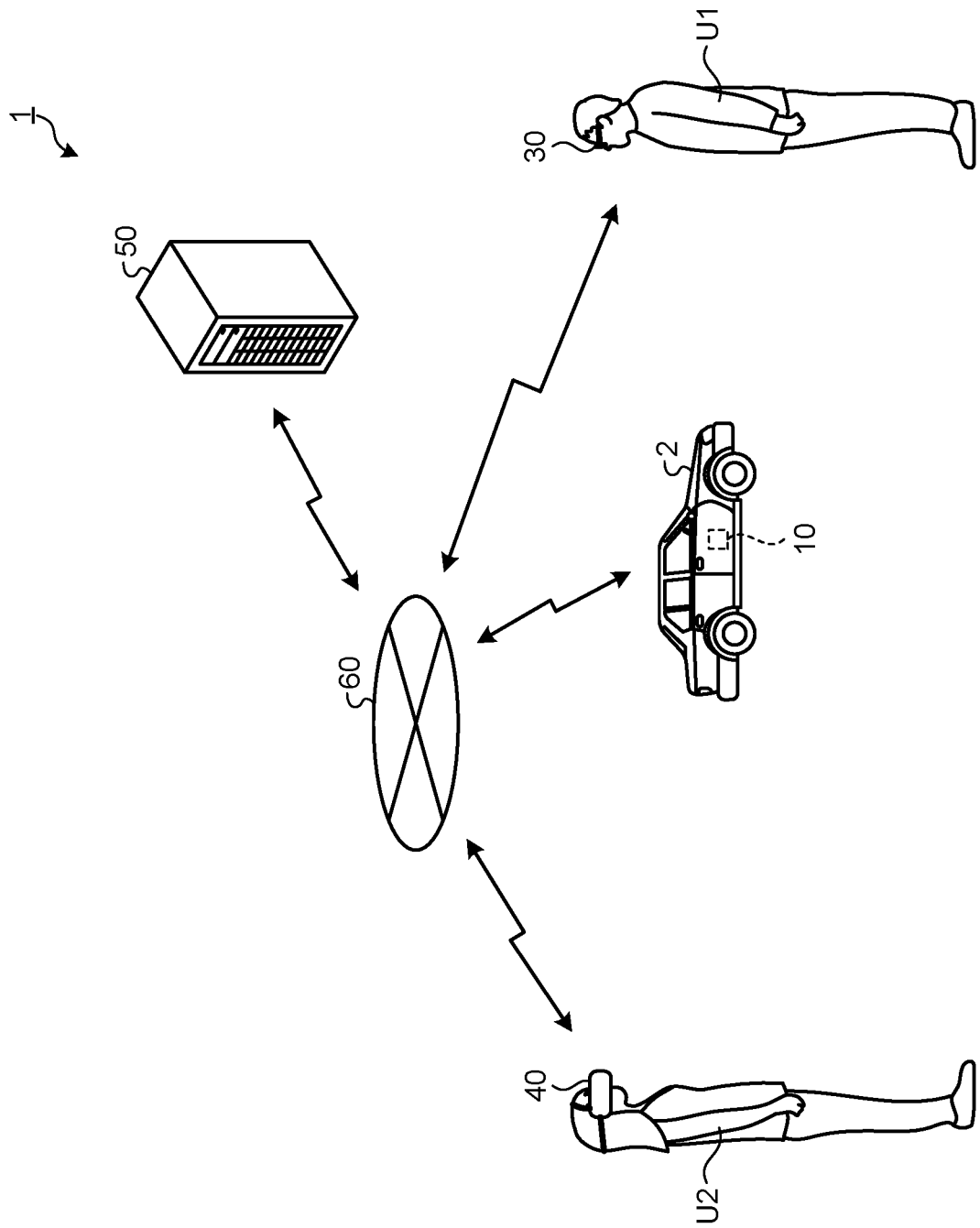
FIG. 1 is a schematic view illustrating a schematic configuration of a display system according to a first embodiment.

FIG. 1 is a schematic view illustrating a schematic configuration of a display system according to a first embodiment. A display system 1 illustrated in FIG. 1 includes a driving support device 10 mounted on a moving body 2, a first wearable device 30 worn on a first wearer U1, and a second wearable device 40 worn on a second wearer U2. Furthermore, the display system 1 includes a server 50 that communicates individually with the driving support device 10, the first wearable device 30, and the second wearable device 40 via a network 60.

While the following description uses an automobile as an example of the moving body 2, the moving body 2 is not limited to this and may be a motorcycle, a drone, an airplane, a ship, a train, or the like. Furthermore, the following description will assume the first wearer U1 as a driver (hereinafter, referred to as a "driver U1") riding in the moving body 2 to drive the moving body 2 and assume the second wearer U2 as a passenger (hereinafter, referred to as a "passenger U2") who uses the second wearable device 40 to virtually ride in the moving body 2.

Figure 2:
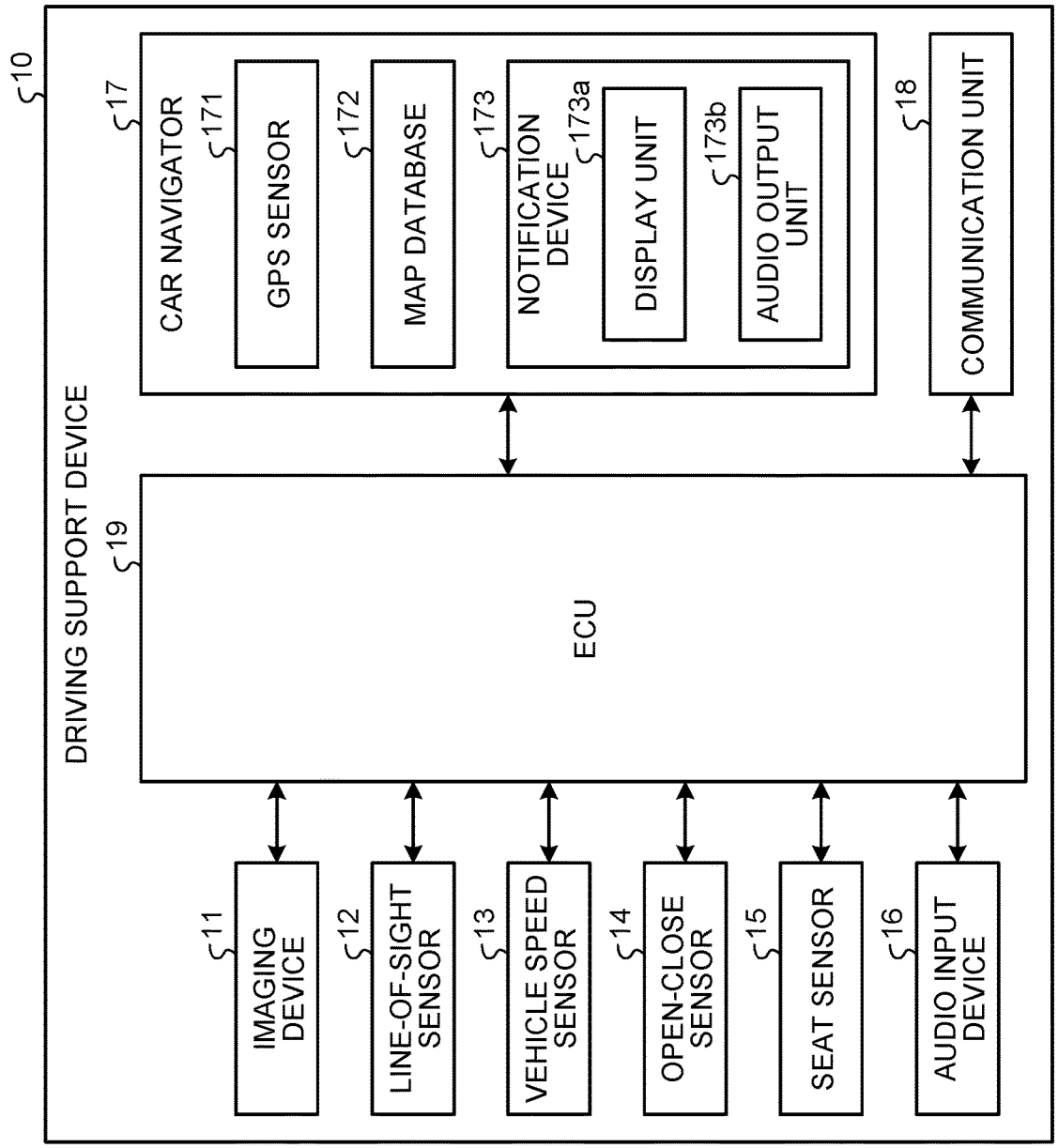
FIG. 2 is a block diagram illustrating a functional configuration of a driving support device according to the first embodiment.

First, a functional configuration of the driving support device 10 will be described. FIG. 2 is a block diagram illustrating a functional configuration of the driving support device 10.

The driving support device 10 illustrated in FIG. 2 is mounted on the moving body 2 and cooperates with other electronic control units (ECUs) mounted on the moving body 2 to support a driver in the moving body 2 in operations during driving. The driving support device 10 includes an imaging device 11, a line-of-sight sensor 12, a vehicle speed sensor 13, an open-close sensor 14, a seat sensor 15, an audio input device 16, a car navigator 17, a communication unit 18, and an ECU 19.

The imaging device 11 is provided in plurality outside the moving body 2. For example, the imaging device 11 is provided at least at four positions in front of, behind, and on both sides of the moving body 2 to achieve an imaging angle of view of 360°. Furthermore, the imaging device 11 is provided in plurality inside the moving body 2. Under the control of the ECU 19, the imaging device 11 captures individual images of an external space and an internal space of the moving body 2 to generate image data in which the external space and the internal space appear, and outputs this image data to the ECU 19. The imaging device 11 includes: an optical system including one or more lenses; and an image sensor such as a charge coupled device (CCD) or a complementary metal oxide semiconductor (CMOS) that receives an optical subject image formed by this optical system to generate image data.

The line-of-sight sensor 12 detects line-of-sight information including the line-of-sight and the retina of the driver U1 riding in the moving body 2 and outputs the detected line-of-sight information to the ECU 19. The line-of-sight sensor 12 includes an optical system, a CCD or CMOS, memory, and a processor including hardware such as a central processing unit (CPU) or a graphics processing unit (GPU). Using well-known template matching, for example, the line-of-sight sensor 12 detects an unmoving part of an eye of the driver U1 (for example, the inner corner of the eye) as a reference point and detects a moving part of the eye (for example, the iris) as a moving point. The line-of-sight sensor 12 detects the line of sight of the driver U1 based on the positional relationship between the reference point and the moving point and then outputs a result of this detection to the ECU 19. Furthermore, the line-of-sight sensor 12 detects the retina of the driver U1 and outputs a result of this detection to the ECU 19.

Note that, although the line of sight of the driver U1 is detected using a visible light camera as the line-of-sight sensor 12 in the first embodiment, the present disclosure is not limited to this, and the line of sight of the driver U1 may be detected using an infrared camera. In a case where an infrared camera is used as the line-of-sight sensor 12, infrared light is emitted to the driver U1 by using an infrared light emitting diode (LED) or the like, a reference point (for example, the corneal reflection) and a moving point (for example, the pupil) are detected from image data generated by capturing an image of the driver U1 using the infrared camera, and then, the line of sight of the driver U1 is detected based on a positional relationship between the reference point and the moving point.

The vehicle speed sensor 13 detects a vehicle speed during the traveling of the moving body 2 and outputs a result of this detection to the ECU 19.

The open-close sensor 14 detects opening and closing states of a door through which the user enters or exits and outputs a result of this detection to the ECU 19. The open-close sensor 14 includes a push switch, for example.

The seat sensor 15 detects seating states of individual seats and outputs a result of this detection to the ECU 19. The seat sensor 15 includes a load detection device, a pressure sensor, or the like disposed below a seat surface of each of seats provided in the moving body 2.

The audio input device 16 receives an input of the voice or sound of the driver U1 and outputs audio data corresponding to the received voice or sound to the ECU 19. The audio input device 16 includes a microphone, an A/D conversion circuit that converts the voice or sound received by the microphone into audio data, and an amplifier circuit that amplifies the audio data.

The car navigator 17 includes a Global Positioning System (GPS) sensor 171, a map database 172, and a notification device 173.

The GPS sensor 171 receives a signal from a plurality of GPS satellites and transmission antennae and calculates a position of the moving body 2 based on the received signal. The GPS sensor 171 includes a GPS reception sensor or the like. Note that the GPS sensors 171 may be provided in plurality to improve the orientation accuracy of the moving body 2.

The map database 172 stores various types of map data. The map database 172 may include a recording medium such as a hard disk drive (HDD) and/or a solid state drive (SSD).

The notification device 173 may include a display unit 173a that displays an image, a video, and text information, and an audio output unit 173b that generates a voice or sound such as an alarm. The display unit 173a includes a display such as a liquid crystal display and an organic electroluminescence (EL) display. The audio output unit 173b includes a loudspeaker.

The car navigator 17 configured as above superimposes a current position of the moving body 2 acquired by the GPS sensor 171 onto the map data stored in the map database 172 and thereby notifies the driver U1 of information including a road along which the moving body 2 is currently traveling, a route to a destination, or the like by using the display unit 173a and the audio output unit 173b.

Under the control of the ECU 19, the communication unit 18 communicates with various devices according to a predetermined communication standard. Specifically, under the control of the ECU 19, the communication unit 18 transmits various types of information to the first wearable device 30 worn by the driver U1 riding in the moving body 2 or to another moving body 2 and receives various types of information from the first wearable device 30 or the other moving body 2. Here, the predetermined communication standard is any of 4G, 5G, Wireless Fidelity (Wi-Fi) (registered trademark) or Bluetooth (registered trademark), for example. The communication unit 18 includes a communication module enabling wireless communication.

The ECU 19 controls operations of individual components of the driving support device 10. The ECU 19 includes memory and a processor including hardware such as a CPU.

Figure 3:
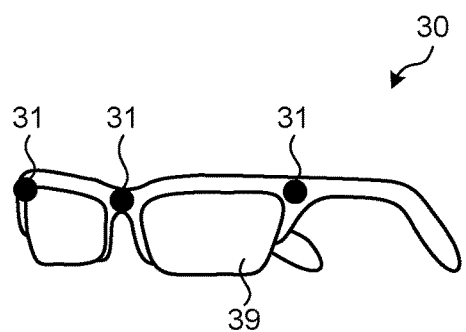
FIG. 3 is a view illustrating a schematic configuration of a first wearable device according to the first embodiment.
Figure 4:
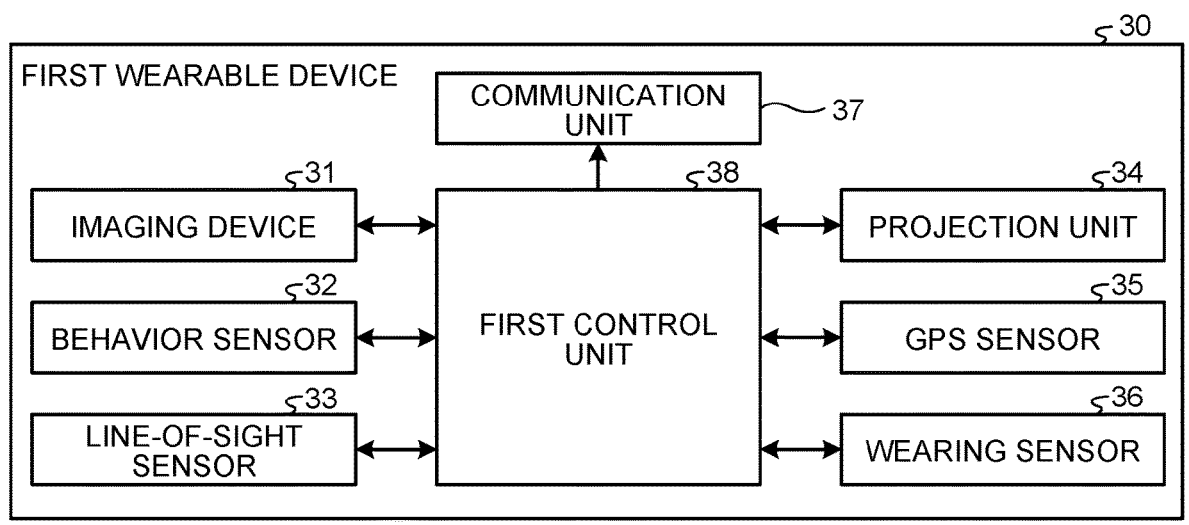
FIG. 4 is a block diagram illustrating a functional configuration of the first wearable device according to the first embodiment.

Next, the configuration of the first wearable device 30 will be described. FIG. 3 is a view illustrating a schematic configuration of the first wearable device 30. FIG. 4 is a block diagram illustrating a functional configuration of the first wearable device 30.

The first wearable device 30 illustrated in FIGS. 3 and 4 is an Augmented Reality (AR) glasses for performing AR and virtually displays an image, video, text information or the like within a visual field region of the driver U1. The first wearable device 30 includes an imaging device 31, a behavior sensor 32, a line-of-sight sensor 33, a projection unit 34, a GPS sensor 35, a wearing sensor 36, a communication unit 37, and a first control unit 38.

As illustrated in FIG. 3, the imaging device 31 is provided in plurality in the first wearable device 30. Under the control of the first control unit 38, the imaging device 31 captures an image along a line of sight of the driver U1 to generate image data and then outputs the generated image data to the first control unit 38. The imaging device 31 includes: an optical system having one or more lenses; and an image sensor such as CCD or CMOS.

The behavior sensor 32 detects behavior information regarding the behavior of the driver U1 wearing the first wearable device 30 and outputs a result of this detection to the first control unit 38. Specifically, the behavior sensor 32 detects angular velocity and acceleration occurring in the first wearable device 30 as behavior information and outputs a result of this detection to the first control unit 38. Furthermore, the behavior sensor 32 detects the geomagnetism to detect the absolute direction as behavior information and outputs a result of this detection to the first control unit 38. The behavior sensor 32 includes a three-axis gyro sensor, a three-axis acceleration sensor, and a three-axis geomagnetic sensor (electronic compass).

The line-of-sight sensor 33 detects the direction of the line of sight of the driver U1 wearing the first wearable device 30 and then outputs a result of this detection to the first control unit 38. The line-of-sight sensor 33 includes an optical system, an image sensor such as a CCD or a CMOS, memory, and a processor including hardware such as a CPU. Using well-known template matching, for example, the line-of-sight sensor 33 detects an unmoving part of the eye (for example, the inner corner of the eye) of the driver U1 as a reference point and detects a moving part of the eye (for example, the iris) as a moving point. Subsequently, the line-of-sight sensor 33 detects the direction of the line of sight of the driver U1 based on the positional relationship between the reference point and the moving point.

Under the control of the first control unit 38, the projection unit 34 projects the image, the video, and the text information toward the retina of the driver U1 wearing the first wearable device 30. The projection unit 34 includes RGB laser beam emitter that emits R, G, and B laser beams, a MEMS mirror that reflects the laser beams, a reflection mirror that projects the laser beams reflected on the MEMS mirror to the retina of the driver U1, or the like. Note that the projection unit 34 may be a unit that projects and displays the image, video, and text information onto a lens unit 39 of the first wearable device 30 under the control of the first control unit 38.

The GPS sensor 35 calculates position information regarding a position of the first wearable device 30 based on the signals received from the plurality of GPS satellites and then outputs the calculated position information to the first control unit 38. The GPS sensor 35 includes a GPS reception sensor or the like.

The wearing sensor 36 detects a wearing state of the driver U1 and then outputs a result of this detection to the first control unit 38. The wearing sensor 36 includes a pressure sensor that detects the pressure when the driver U1 wears the first wearable device 30, a vital sensor that detects vital information such as body temperature, pulse, brain waves, blood pressure, the perspiration state, or the like, of the driver U1.

Under the control of the first control unit 38, the communication unit 37 transmits various types of information to the driving support device 10 or the server 50 and receives various types of information from the driving support device 10 or the server 50 via the network 60 in accordance with a predetermined communication standard. The communication unit 37 includes a communication module enabling wireless communication.

The first control unit 38 controls operation of individual components of the first wearable device 30. The first control unit 38 includes memory and a processor including hardware such as a CPU. Based on the line-of-sight information and behavior information of the driver U1 detected by the line-of-sight sensor 33, the first control unit 38 controls the projection unit 34 to output the first virtual image input from the server 50 described below via the network 60, onto the visual field region of the driver U1. The details of the first virtual image will be described below.

Figure 5:
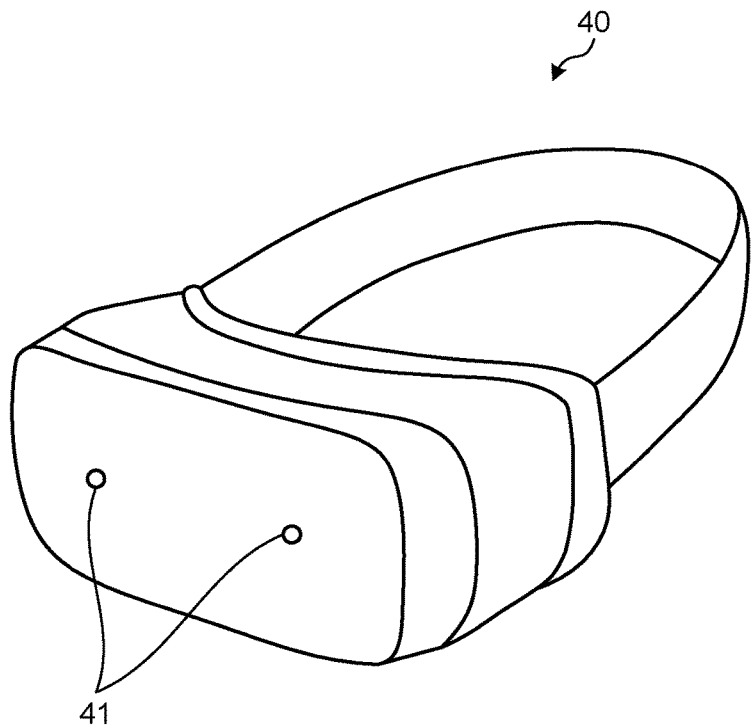
FIG. 5 is a view illustrating a schematic configuration of a second wearable device according to the first embodiment.
Figure 6:
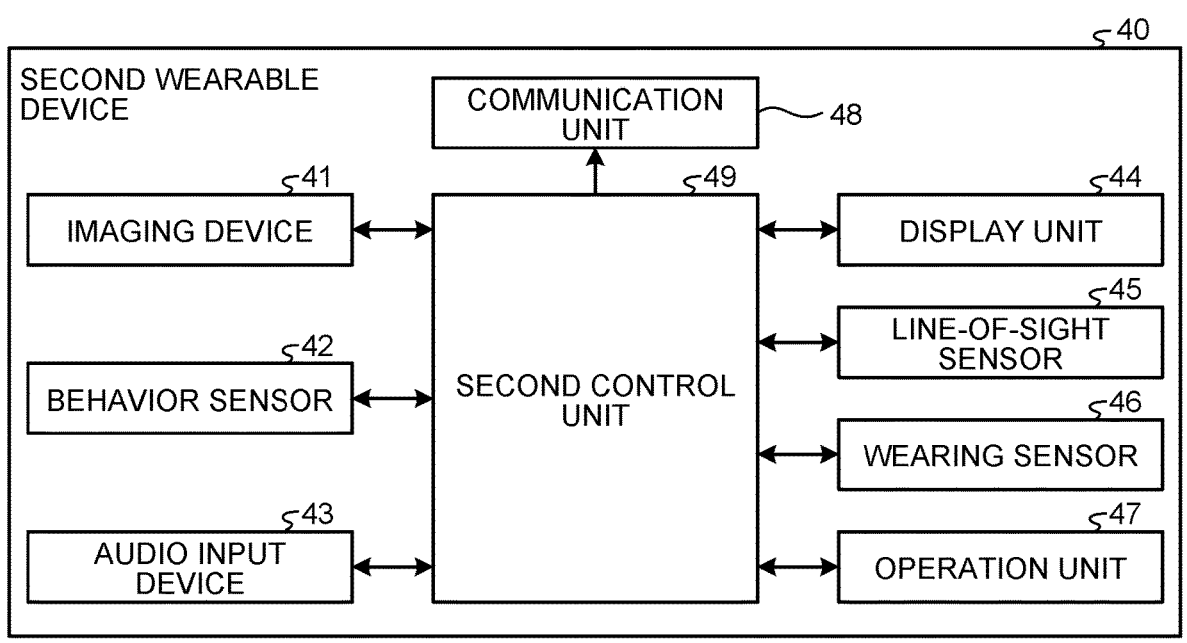
FIG. 6 is a block diagram illustrating a functional configuration of the second wearable device according to the first embodiment.

Next, the configuration of the second wearable device 40 will be described. FIG. 5 is a view illustrating a schematic configuration of the second wearable device 40. FIG. 6 is a block diagram illustrating a functional configuration of the second wearable device 40.

The second wearable device 40 illustrated in FIGS. 5 and 6 is a Head Mounted Display (HMD) to achieve Mixed Reality (MR) or Virtual Reality (VR). The second wearable device 40 displays, toward the passenger U2, a stereoscopically visible image, video, text information, or the like, obtained by superimposing the real world on the virtual world (digital space). The second wearable device 40 includes an imaging device 41, a behavior sensor 42, an audio input device 43, a display unit 44, a line-of-sight sensor 45, a wearing sensor 46, an operation unit 47, a communication unit 48, and a second control unit 49.

As illustrated in FIG. 5, the imaging device 41 is provided in plurality in the second wearable device 40. Under the control of the second control unit 49, the imaging device 41 captures a line-of-sight image of the passenger U2 to generate two pieces of image data having parallax and then outputs the generated image data to the second control unit 49. The imaging device 41 includes: an optical system having one or more lenses; and an image sensor such as CCD or CMOS.

The behavior sensor 42 detects behavior information regarding the behavior of the passenger U2 wearing the second wearable device 40 and then outputs a result of this detection to the second control unit 49. Specifically, the behavior sensor 42 detects the angular velocity and acceleration occurring in the second wearable device 40 as behavior information and then outputs a result of this detection to the second control unit 49. Furthermore, the behavior sensor 42 detects the geomagnetism to detect the absolute direction as behavior information and outputs a result of this detection to the second control unit 49. The behavior sensor 42 includes a three-axis gyro sensor, a three-axis acceleration sensor, and a three-axis geomagnetic sensor.

The audio input device 43 receives an input of the voice or sound of the passenger U2 and outputs audio data corresponding to the received voice or sound to the second control unit 49. The audio input device 43 includes a microphone, an A/D conversion circuit that converts the voice/sound received by the microphone into audio data, and an amplifier circuit that amplifies the audio data.

The display unit 44 displays a stereoscopically visible image, video, text information, or the like, under the control of the second control unit 49. The display unit 44 includes a pair of left and right display panels having a predetermined parallax. The display panel uses liquid crystal, organic Electro Luminescence (EL), or the like.

The line-of-sight sensor 45 detects the direction of the line of sight of the passenger U2 being a wearer of the second wearable device 40 and then outputs a result of this detection to the second control unit 49. The line-of-sight sensor 45 includes an optical system, an image sensor such as a CCD or a CMOS, memory, and a processor including hardware such as a CPU. Using well-known template matching, for example, the line-of-sight sensor 45 detects an unmoving part of the eye of the passenger U2 as a reference point and detects a moving part of the eye as a moving point. Subsequently, the line-of-sight sensor 45 detects the direction of the line of sight of the passenger U2 based on the positional relationship between the reference point and the moving point.

The wearing sensor 46 detects a wearing state of the passenger U2 and then outputs a result of this detection to the second control unit 49. The wearing sensor 46 includes a pressure sensor, a vital sensor detecting user's vital information such as a body temperature, a pulse, brain waves, blood pressure, and the perspiration state, or the like.

The operation unit 47 receives an input of an operation of the passenger U2 and then outputs a signal corresponding to the received operation to the second control unit 49. The operation unit 47 includes buttons, switches, a jog dial, a touch panel, or the like.

Under the control of the second control unit 49, the communication unit 48 transmits various types of information to the server 50 and receives various types of information from the server 50 via the network 60 in accordance with a predetermined communication standard. The communication unit 48 includes a communication module enabling wireless communication.

The second control unit 49 controls the operation of individual components of the second wearable device 40. The second control unit 49 includes memory and a processor including hardware such as a CPU. The second control unit 49 controls the display unit 44 to display a second virtual image input from the server 50 described below via the network 60. The details of the second virtual image will be described below.

Figure 7:
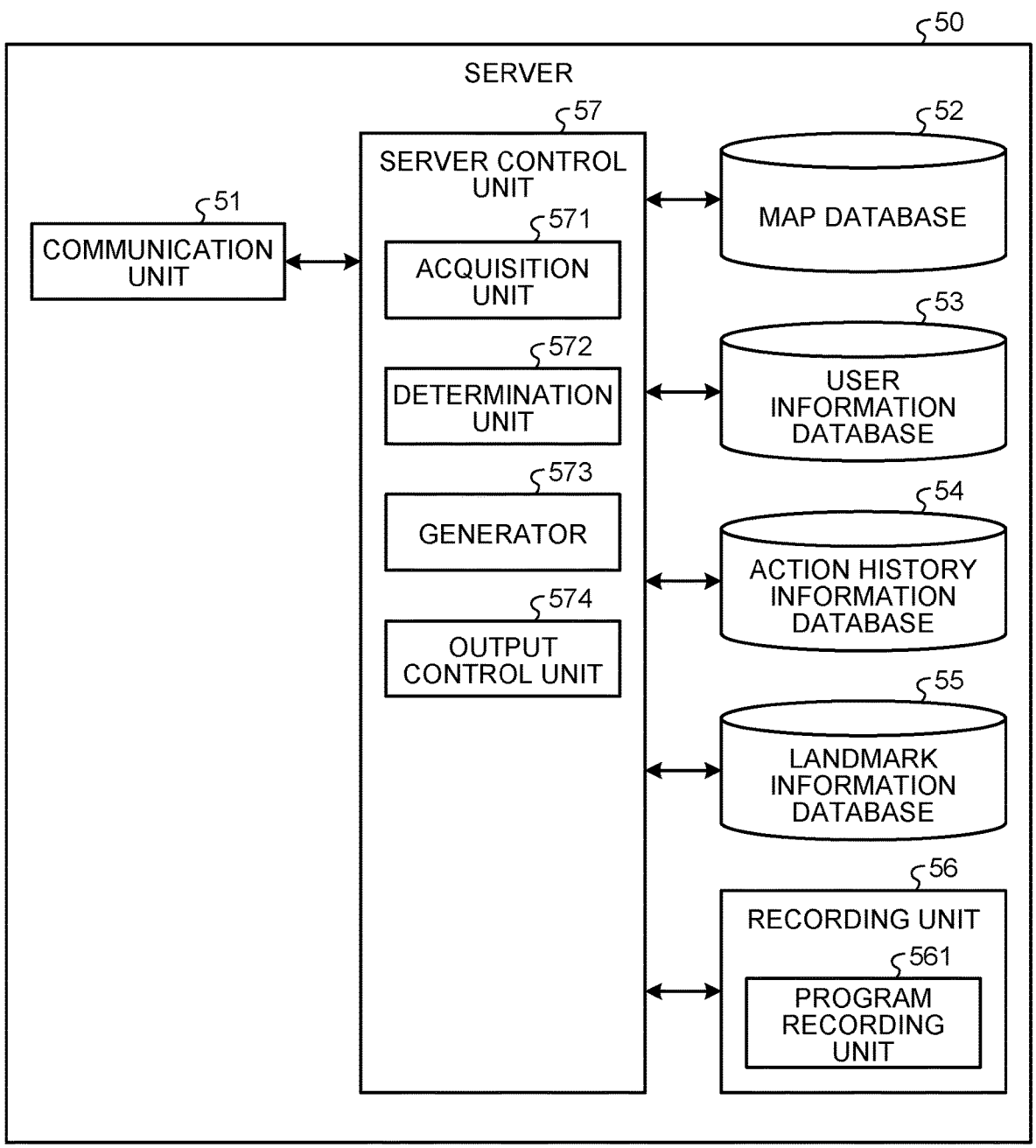
FIG. 7 is a block diagram illustrating a functional configuration of a server according to the first embodiment.

Next, a configuration of the server 50 will be described. FIG. 7 is a block diagram illustrating a functional configuration of the server 50.

The server 50 illustrated in FIG. 5 includes a communication unit 51, a map database 52 (hereinafter referred to as "map DB 52"), a user information database 53 (hereinafter referred to as "user information DB 53"), an action history information database 54 (hereinafter, "action history information DB 54"), a landmark information database 55 (hereinafter "landmark information DB 55"), a recording unit 56, and a server control unit 57.

Under the control of the server control unit 57, the communication unit 51 bidirectionally communicates with the driving support device 10, the first wearable device 30, and the second wearable device 40 via the network 60 in accordance with a predetermined communication standard. The communication unit 51 includes a communication module enabling communication.

The map DB 52 records a plurality of pieces of map data. The map DB 52 is formed by using HDD or SSD.

The user information DB 53 records identification information for identifying each of the plurality of wearers, biometric information for identifying each of the plurality of wearers, and an avatar image or hologram image linked to each of the plurality of wearers, in association with each other. Specifically, the user information DB 53 records first identification information for identifying the driver U1 of the moving body 2, biometric information of the driver U1, and an avatar image or a hologram image linked to the first identification information of the driver U1, in association with each other. Here, examples of the biometric information include an iris, a voice print, or a fingerprint. The user information DB 53 is formed by using HDD or SSD. Furthermore, the user information DB 53 records second identification information for identifying the passenger U2, biometric information of the passenger U2, and an avatar image or a hologram image linked to the second identification information of the passenger U2, in association with each other.

The action history information DB 54 records action history information in which the action history of the driver U1 linked to the first identification information, the action history linked to the identification information of the passenger U2, and captured image or movies of places individually visited by the driver U1 and the passenger U2 in the past are associated with each other. The action history information DB 54 is formed by using HDD, SSD or the like.

The landmark information DB 55 records a map, landmark position information indicating the positions and names of each of the plurality of landmarks on the map, and at least one of current or past landmark images of each of the plurality of landmarks, in association with each other. The landmark information DB 55 is formed by using HDD or SSD.

The recording unit 56 is formed by using volatile memory, non-volatile memory, or the like. The recording unit 56 includes a program recording unit 561 that records various programs to be executed by the server 50.

The server control unit 57 includes memory and a processor including some sort of hardware such as a CPU. The server control unit 57 controls operations of the individual components of the server 50. The server control unit 57 includes an acquisition unit 571, a determination unit 572, a generator 573, and an output control unit 574. In the first embodiment, the server control unit 57 functions as an image processing apparatus.

The acquisition unit 571 acquires various types of information individually from the driving support device 10 of the moving body 2, the first wearable device 30, and the second wearable device 40 via the communication unit 51 and the network 60. Specifically, the acquisition unit 571 acquires individual behavior information and vital information of the driver U1 and the passenger U2, the first identification information of the driver U1, and the second identification information of the passenger U2.

Based on the behavior information of the driver U1 acquired by the acquisition unit 571, the determination unit 572 determines whether the driver U1 faces the direction in which the passenger U2 virtually sits in the moving body 2. Furthermore, the determination unit 572 determines whether audio data has been input from at least one of the audio input device 16 of the driving support device 10 or the audio input device 43 of the second wearable device 40.

Using the spatial information of the moving body 2 acquired by the acquisition unit 571 and the line-of-sight information of the driver U1 detected by the line-of-sight sensor 33 of the first wearable device 30, the generator 573 generates a first virtual image representing a state where the passenger U2 virtually rides in the moving body 2 as observed from the viewpoint of the driver U1, the first virtual image reflecting the behavior of the passenger U2. Furthermore, using the spatial information of the moving body 2 acquired by the acquisition unit 571 and the line-of-sight information of the passenger U2 detected by the line-of-sight sensor 45 of the second wearable device 40, the generator 573 generates a second virtual image representing a state where the driver U1 rides in the moving body 2 as observed from a viewpoint of the passenger U2, the second virtual image reflecting the behavior of the driver U1 and virtually representing the external space of the moving body 2. Details of the first virtual image and the second virtual image generated by the generator 573 will be described below.

The output control unit 574 outputs the first virtual image generated by the generator 573 to the first wearable device 30 via the network 60 and the communication unit 51. Furthermore, the output control unit 574 outputs the second virtual image generated by the generator 573 to the second wearable device 40 via the network 60 and the communication unit 51.

Figure 8:
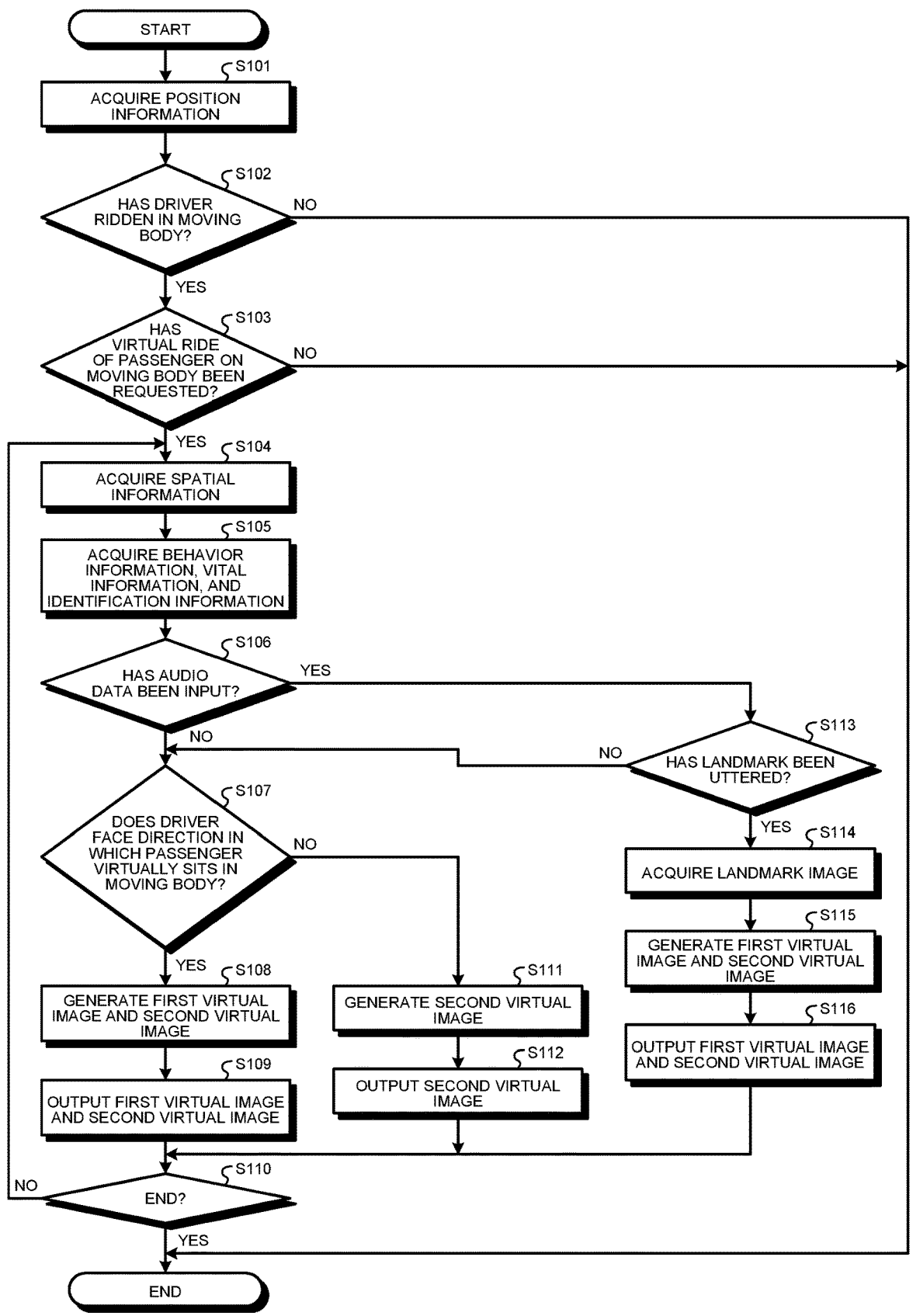
FIG. 8 is a flowchart illustrating an outline of processes executed by the server according to the first embodiment.

Next, processes executed by the server 50 will be described. FIG. 8 is a flowchart illustrating an outline of processes executed by the server 50.

As illustrated in FIG. 8, first, the acquisition unit 571 acquires the position information of the first wearable device 30, the position information of the second wearable device 40, and the position information of the moving body (step S101).

Subsequently, based on the position information of the first wearable device 30 and the position information of the moving body 2 acquired by the acquisition unit 571, a determination unit 572 determines whether the driver U1 has ridden in the moving body 2 (step S102). Note that the determination unit 572 may determine whether the driver U1 has ridden in the moving body 2 based on the detection result of the open-close sensor 14 and the detection result of the seat sensor 15 of the driving support device 10, in addition to the position information of the first wearable device 30 and the position information of the moving body 2. In a case where the determination unit 572 determines that the driver U1 has ridden in the moving body 2 (step S102: Yes), the server 50 proceeds to step S103 described below. In contrast, in a case where the determination unit 572 determines that the driver U1 has not ridden in the moving body 2 (step S102: No), the server 50 ends the present process.

In step S103, the determination unit 572 determines whether a request signal requesting the passenger U2's virtual ride in the moving body 2 has been input from the operation unit 47 of the second wearable device 40 In a case where the determination unit 572 determines that the request signal for requesting the passenger U2's virtual ride in the moving body 2 has been input from the second wearable device 40 (step S103: Yes), the server 50 proceeds to step S104 described below. In contrast, in a case where the determination unit 572 determines that the request signal requesting the passenger U2's virtual ride in the moving body 2 is not input from the second wearable device (step S103: No), the server 50 ends the present process.

In step S104, the acquisition unit 571 acquires spatial information regarding the internal space and the external space of the moving body 2. Specifically, the acquisition unit 571 acquires image data generated by imaging of the inside of the moving body 2 by the imaging device 11 of the moving body 2, as spatial information regarding the internal space, via the network 60 and the communication unit 51. Furthermore, the acquisition unit 571 acquires the image data generated by imaging of the external space of the moving body 2 by the imaging device 11 of the moving body 2, as spatial information regarding the external space. Although the acquisition unit 571 acquires the image data generated by the imaging device 11 of the moving body 2 as the spatial information regarding the external space, the present disclosure is not limited to this. The acquisition unit 571 may acquire, as spatial information regarding external space, image data around the current position of the moving body 2 from the map data recorded in the map database 52 based on the position information of the moving body 2, for example.

Subsequently, the acquisition unit 571 acquires the behavior information, vital information, and identification information individually for the driver U1 and the passenger U2 (step S105). Specifically, the acquisition unit 571 acquires the behavior information detected by the behavior sensor 32 of the first wearable device 30 and the vital information detected by the wearing sensor 36, via the network 60 and the communication unit 51. Furthermore, the acquisition unit 571 acquires the line-of-sight information of the driver U1 detected by the line-of-sight sensor 33 of the first wearable device 30 as first identification information for identifying the driver U1. Furthermore, the acquisition unit 571 acquires the behavior information detected by the behavior sensor 42 of the second wearable device 40 and the vital information detected by the wearing sensor 46, via the network 60 and the communication unit 51. Furthermore, the acquisition unit 571 acquires the line-of-sight information of the passenger detected by the line-of-sight sensor 45 of the second wearable device 40 as second identification information of the passenger U2.

The acquisition unit 571 may acquire in a time series the image data of the driver U1 generated by the imaging device 11 of the moving body 2. In this case, the server control unit 57 may apply an object detection process or image processing using a well-known optical flow on the time series image data to detect the behavior information of the driver U1. Furthermore, the server control unit 57 may apply well-known template matching on the image corresponding to the image data to detect the face of the driver U1 and may further detect this face as the first identification information.

Thereafter, the determination unit 572 determines whether audio data has been input from at least one of the audio input device 16 of the driving support device 10 or the audio input device 43 of the second wearable device 40 (step S106). In a case where the determination unit 572 determines that the audio data has been input (step S106: Yes), the server 50 proceeds to step S113 described below. In contrast, in a case where the determination unit 572 determines that the audio data has not been input (step S106: No), the server 50 proceeds to step S107 described below.

In step S107, based on the behavior information of the driver U1 acquired by the acquisition unit 571, the determination unit 572 determines whether the driver U1 faces the direction in which the passenger U2 virtually sits in the moving body 2. In a case where the determination unit 572 determines that the driver U1 faces the direction in which the passenger U2 virtually sits in the moving body 2 (step S107: Yes), the server 50 proceeds to step S108 described below. In contrast, in a case where the determination unit 572 determines that the driver U1 does not face the direction in which the passenger U2 virtually sits in the moving body 2 (step S107: No), the server 50 proceeds to step S111 described below.

In step S108, the generator 573 generates the first virtual image and the second virtual image. Specifically, using the spatial information acquired by the acquisition unit 571 and the line-of-sight information of the driver U1 as the first identification information detected by the line-of-sight sensor 33 of the first wearable device 30, the generator 573 generates a first virtual image representing a state where the passenger U2 virtually rides in the moving body 2 as observed from the viewpoint of the driver U1, the first virtual image reflecting the behavior information of the passenger U2. Furthermore, using the spatial information acquired by the acquisition unit 571 and the line-of-sight information of the passenger U2 as the second identification information detected by the line-of-sight sensor 45 of the second wearable device 40, the generator 573 generates a second virtual image representing a state where the driver U1 rides in the internal space of the moving body 2 as observed from the viewpoint of the passenger U2, the second virtual image reflecting the behavior information of the driver U1 and virtually representing the external space of the moving body 2. After step S108, the server 50 proceeds to step S109 described below.

Here, the first virtual image and the second virtual image generated by the generator 573 will be individually described in detail.

Figure 9:
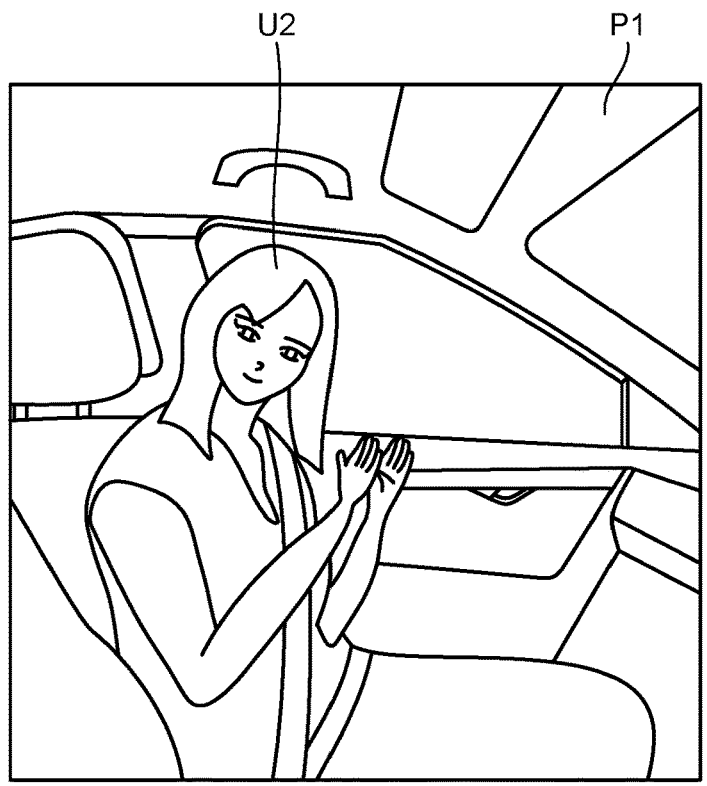
FIG. 9 is a view schematically illustrating an example of a first virtual image generated by a generator according to the first embodiment.

First, details of the first virtual image generated by the generator 573 will be described. FIG. 9 is a view schematically illustrating an example of the first virtual image generated by the generator 573.

As illustrated in FIG. 9, the generator 573 acquires, from the user information DB 53, an avatar image of the passenger U2 corresponding to the second identification information acquired by the acquisition unit 571. Subsequently, using an avatar image, the spatial information acquired in step S104 described above by the acquisition unit 571 and the line-of-sight information of the driver U1 detected by the line-of-sight sensor 33 of the first wearable device 30, the generator 573 generates a first virtual image P1 of a state where the passenger U2 virtually rides in the moving body 2 as observed from the viewpoint of the driver U1. In this case, the generator 573 generates the first virtual image P1 that reflects the behavior information of the passenger U2 acquired by the acquisition unit 571. For example, as illustrated in FIG. 9, in a case where the determination unit 572 determines that the driver U1 is directing his face to the passenger seat, the generator 573 generates the first virtual image P1 that may be virtually recognized from the viewpoint of the driver U1. In this case, the generator 573 generates the first virtual image P1 including an image of the passenger U2, which is an avatar virtually reflecting the behavior information such as gestures and facial expressions of the passenger U2. At this time, the generator 573 may reflect the vital information of the passenger U2 acquired by the acquisition unit 571 on the passenger U2 being the avatar. For example, the generator 573 may generate the first virtual image P1 that reflects the complexion or the like of the passenger U2 being the avatar, based on the vital information of the passenger U2.

Figure 10:
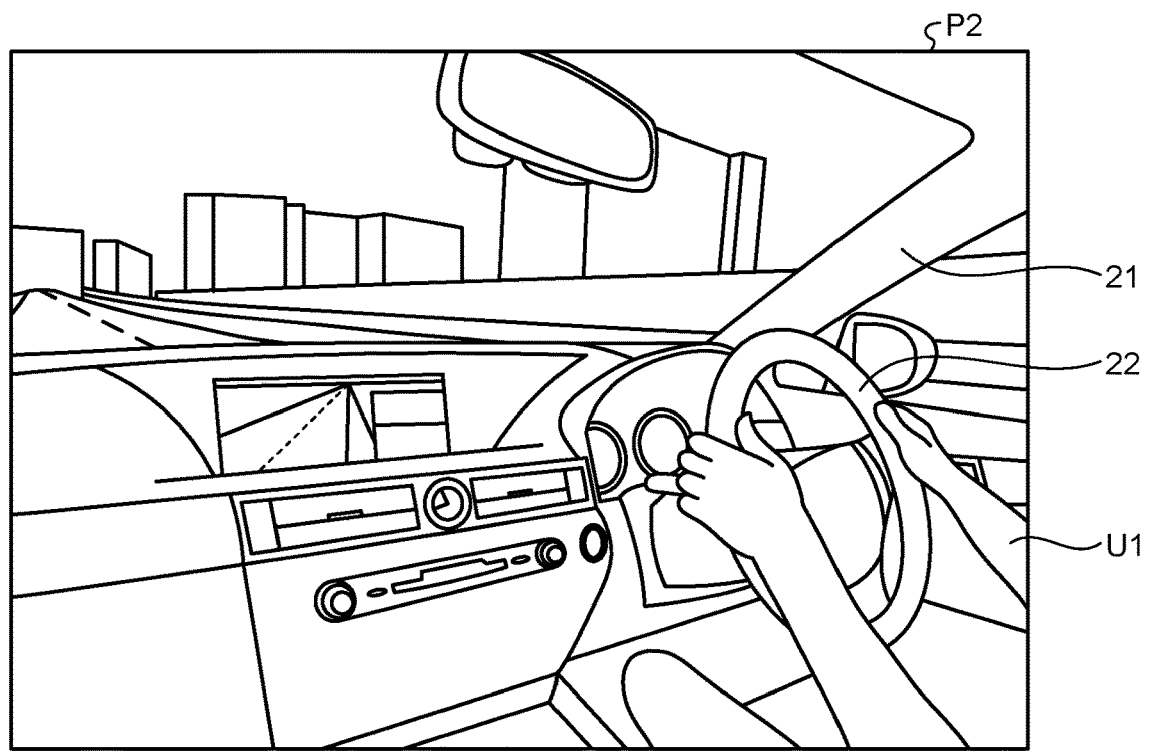
FIG. 10 is a view schematically illustrating an example of a second virtual image generated by the generator according to the first embodiment.

Next, details of the second virtual image generated by the generator 573 will be described. FIG. 10 is a view schematically illustrating an example of the second virtual image generated by the generator 573.

As illustrated in FIG. 10, the generator 573 acquires, from the user information database 53, an avatar image of the driver U1 corresponding to the first identification information acquired by the acquisition unit 571. Subsequently, using the avatar image, the spatial information acquired in the above-described step S104 by the acquisition unit 571 and the line-of-sight information of the passenger U2 detected by the line-of-sight sensor 45 of the second wearable device 40, the generator 573 generates a second virtual image P2 of the state in which the driver U1 rides in the internal space of the moving body 2 as observed from the viewpoint of the passenger U2, the second virtual image P2 virtually representing the external space of the moving body 2. In this case, the generator 573 generates the second virtual image P2 that reflects the behavior information of the driver U1 acquired by the acquisition unit 571. For example, as illustrated in FIG. 10, in a case where the determination unit 572 determines that the face of the passenger U2 is directed to a front pillar 21 of the moving body 2, the generator 573 generates the second virtual image P2 in which the driver U1 being an avatar image is operating a steering wheel 22, the second virtual image P2 as observed from the viewpoint of the passenger U2. Furthermore, the second virtual image P2 includes images of the internal space of the moving body 2 and the external space being a view outside the moving body 2. In addition, the generator 573 may reflect the vital information of the driver U1 acquired by the acquisition unit 571 on the driver U1 being an avatar. For example, the generator 573 may generate the second virtual image P2 that reflects the complexion or the like of the driver U1, being an avatar, based on the vital information of the driver U1.

Furthermore, the generator 573 may generate the first virtual image and the second virtual image by using the position information of the moving body 2 acquired from the action history information DB 54 acquired by the acquisition unit 571, and using the action history information based on the first identification information and the second identification information.

Figure 11:
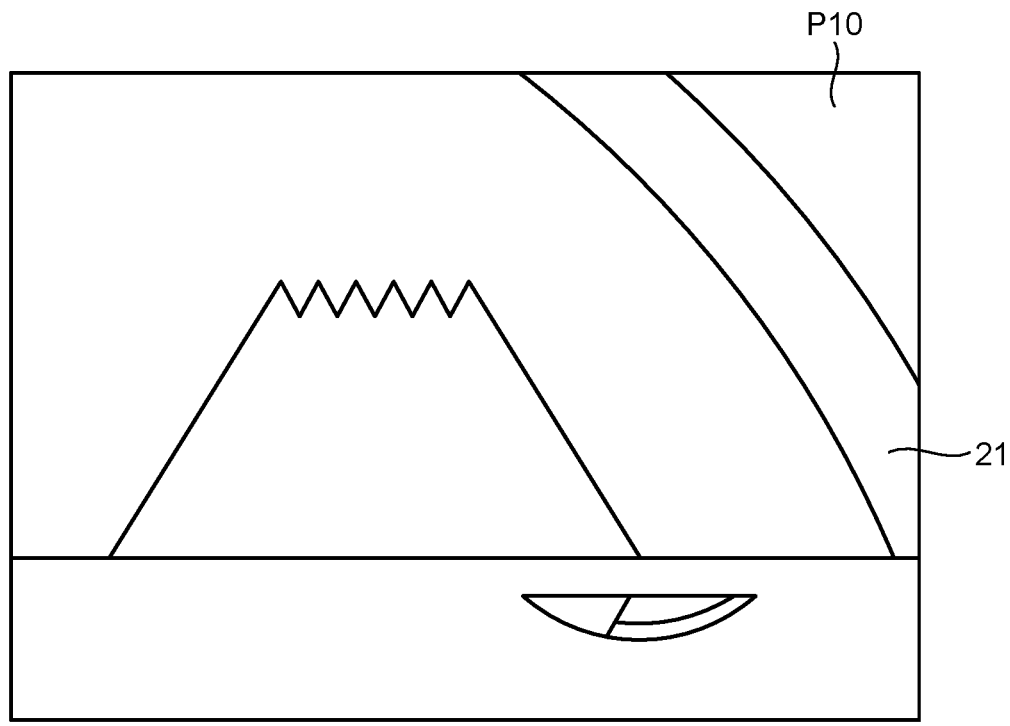
FIG. 11 is a view schematically illustrating an example of the second virtual image generated by the generator according to the first embodiment.
Figure 12:
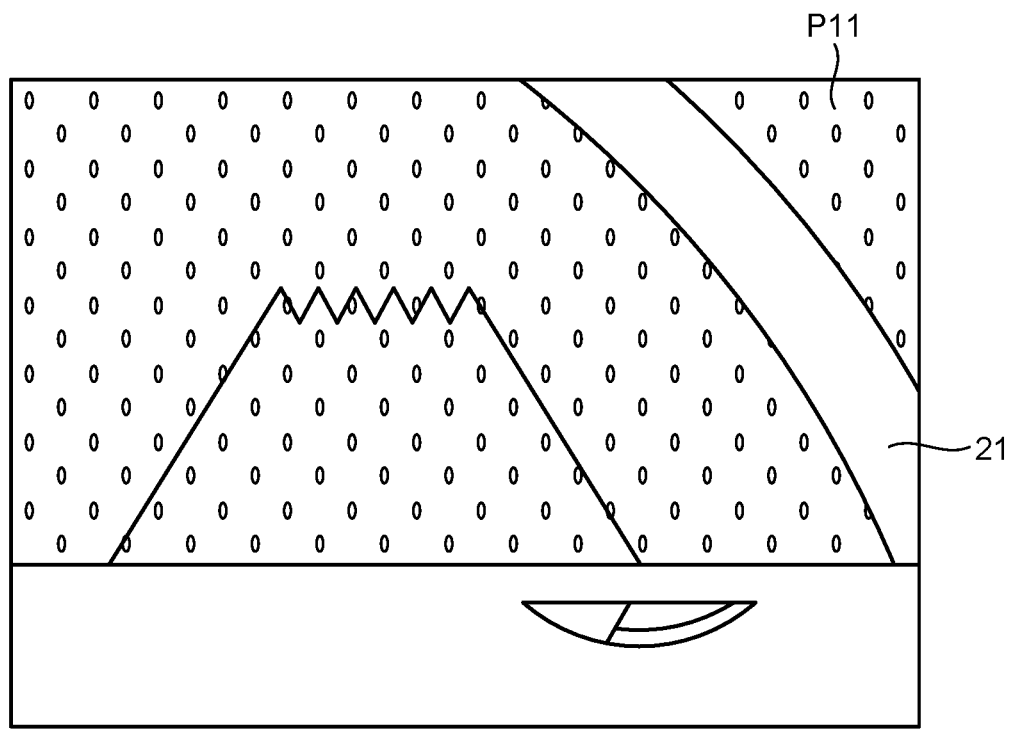
FIG. 12 is a view schematically illustrating an example of the second virtual image generated by the generator according to the first embodiment.

FIG. 11 is a view schematically illustrating another example of the second virtual image generated by the generator 573. FIG. 12 is a view schematically illustrating another example of the second virtual image generated by the generator 573. In the following, a case where the generator 573 generates the second virtual image will be described.

As illustrated in FIG. 11, the generator 573 generates a second virtual image P10 representing a part of the external space of the moving body 2, by using a captured image or movie of past visited places individually captured by the driver U1 and the passenger U2 included in the action history information obtained by the acquisition unit 571 based on the position information of the moving body 2, the first identification information and the second identification information, and by using an avatar image and spatial information. For example, the generator 573 generates the second virtual image P10 representing a part of the external space of the moving body 2 by using a captured image or a movie taken when one of the driver U1 or the passenger U2 visited the current position of the moving body 2 in the past. This enables the driver U1 and the passenger U2 to talk about their memories with shared nostalgia while virtually sharing the driving in the moving body 2.

Furthermore, as illustrated in FIG. 12, the generator 573 may generate a second virtual image P11 while incorporating the weather at the current position around the moving body 2. In this case, for example, as illustrated in FIG. 12, when the weather around the moving body 2 is rainy, the generator 573 may generate the second virtual image P11 representing a part of the external space of the moving body 2 by superimposing a rainy image (animation or video of rain) onto the region represented by a captured image or a movie taken at the past visit by the driver U1 and the passenger U2. With this application, the driver U1 and the passenger U2 may enjoy the situation in which the memories of the past visits and the current real-time situation around the moving body 2 are virtually superimposed with each other, making it possible to enjoy real-time driving with the driver U1 even when the passenger U2 does not actually rides in the moving body 2.

In FIGS. 11 and 12, the generator 573 represents a part of the external space of the moving body 2 by using a captured image or movie taken when the driver U1 and the passenger U2 visited in the past at the current position of the moving body 2. The present disclosure, however, is not limited to this. For example, the generator 573 may generate the second virtual image obtained by superimposing the captured image or movie taken when the driver U1 and the passenger U2 visited in the past at the current position of the moving body 2 onto a partial display region on an image representing the current external space of the moving body 2.

Returning to FIG. 8, the description of step S109 and subsequent steps will be continued.

In step S109, the output control unit 574 outputs the first virtual image P1 generated by the generator 573 to the first wearable device 30 via the network 60 and the communication unit 51, and also outputs the second virtual image P2 generated by the generator 573 to the second wearable device 40. With this configuration, the driver U1 and the passenger U2 may obtain a sense of unity between the users even when they have a distance from each other. Furthermore, the driver U1 and the passenger U2 may individually enjoy a virtual drive together inside the space of the same moving body 2 even under the situation where the passenger U2 and the driver U1 have a difficulty in driving in the moving body 2 together.

Subsequently, when an instruction signal instructing ending has been input from the first wearable device 30 or the second wearable device 40 (step S110: Yes), the server 50 ends the present process. In contrast, when the instruction signal instructing ending has not been input from the first wearable device 30 or the second wearable device 40 (step S110: No), the server 50 returns to step S104 described above.

In step S111, the generator 573 generates the second virtual image. Specifically, using the spatial information acquired by the acquisition unit 571 in step S104 described above, the generator 573 generates the second virtual image P2 of a state where the driver U1 rides in the internal space of the moving body 2 as observed from the viewpoint of the passenger U2, the second virtual image P2 virtually representing the external space of the moving body 2.

Subsequently, the output control unit 574 outputs the second virtual image generated by the generator 573 to the second wearable device 40 (step S112). After step S112, the server 50 proceeds to step S110.

In step S113, the determination unit 572 determines whether the driver U1 or the passenger U2 has uttered a landmark name, based on the audio data input from the audio input device 16 of the driving support device 10. Specifically, the determination unit 572 performs a well-known voice analysis process on the audio data input from the audio input device 16 of the driving support device 10 to determine whether the driver U1 or the passenger U2 has uttered a landmark name. In a case where the determination unit 572 determines that the driver U1 or the passenger U2 has uttered the landmark name (step S113: Yes), the server 50 proceeds to step S114 described below. In contrast, in a case where the determination unit 572 determines that the driver U1 or the passenger U2 has not uttered a landmark name (step S113: No), the server 50 proceeds to step S107.

In step S114, the acquisition unit 571 acquires at least one of the current or past landmark images from the landmark information DB 55, based on the position information of the moving body 2 and the landmark name uttered by the driver U1 or passenger U2.

Subsequently, the generator 573 generates a first virtual image and a second virtual image that represent a part of the external space of the moving body 2 using at least one of the current or past landmark images (step S115). Specifically, the generator 573 generates the first virtual image and the second virtual image representing a part of the external space of the moving body 2 by using the avatar image acquired by the acquisition unit 571, the spatial information of the moving body 2, and at least one of the current or past landmark images.

Figure 13:
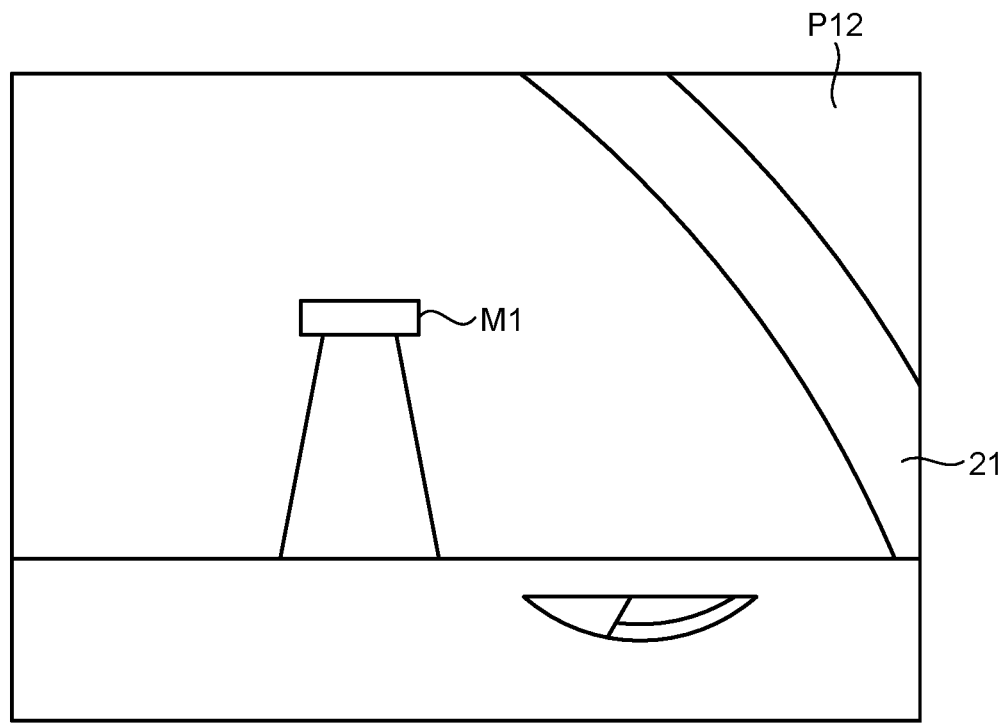
FIG. 13 is a view schematically illustrating another example of the second virtual image generated by the generator according to the first embodiment.
Figure 14:
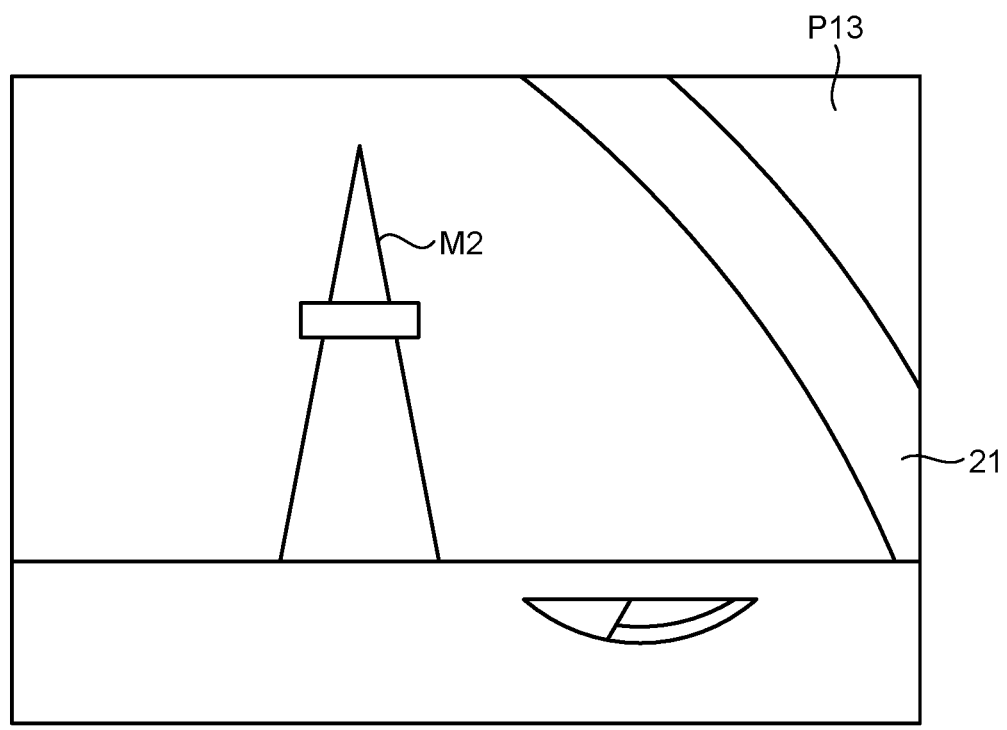
FIG. 14 is a view schematically illustrating another example of the second virtual image generated by the generator according to the first embodiment.

FIG. 13 is a view schematically illustrating another example of the second virtual image generated by the generator 573. FIG. 14 is a view schematically illustrating another example of the second virtual image generated by the generator 573.

As illustrated in FIG. 13, using at least one of the current or past landmark images acquired by the acquisition unit 571, and using position information of the moving body 2, an avatar image, and spatial information, the generator 573 generates a second virtual image P12 including an image of a past landmark M1 in a part of the external space of the moving body 2. For example, as illustrated in FIG. 13, the generator 573 generates the second virtual image P12 virtually representing the past landmark M1 in the external space at the current position of the moving body 2. This enables the driver U1 and the passenger U2 to share nostalgia regarding their memories of the landmarks.

As illustrated in FIG. 14, the generator 573 may generate a second virtual image P13 temporally changing from an image of the past landmark M1 to a current landmark M2 (from FIG. 13 to FIG. 14) by using the current landmark image acquired by the acquisition unit 571, position information of the moving body 2, an avatar image, and spatial information. This enables the driver U1 and the passenger U2 to share nostalgia regarding their memories of the landmarks and talk about the landmark M2 across the time from past to current.

Returning to FIG. 8, the description of step S116 and subsequent steps will be continued.

In step S116, the output control unit 574 outputs the first virtual image generated by the generator 573 to the first wearable device 30, and also outputs the second virtual image generated by the generator 573 to the second wearable device 40. After step S116, the server 50 proceeds to step S110.

According to the first embodiment described above, the output control unit 574 outputs the first virtual image generated by the generator 573, which is an image of the state in which the passenger U2 virtually rides in the moving body 2 as observed from the viewpoint of the driver U1, the first virtual image reflecting the behavior of the passenger U2, to the first wearable device 30. This makes it possible to obtain a sense of unity between the users.

Furthermore, according to the first embodiment, the output control unit 574 outputs the second virtual image generated by the generator 573, which is an image of the state in which the driver U1 rides in the moving body 2 as observed from the viewpoint of the passenger U2, the second virtual image reflecting the behavior of the driver U1 and virtually representing an external space of the moving body 2, to the second wearable device 40 worn by the passenger U2. This makes it possible to virtually enjoy experience of riding in the moving body 2 even when the passenger U2 does not actually ride in the moving body 2, leading to acquisition of a sense of unity between the users.

Furthermore, according to the first embodiment, the generator 573 generates the first virtual image in a case where the driver U1 faces the direction in which the passenger U2 virtually sits in the moving body 2, enabling the driver U1 to concentrate on the driving of the moving body 2.

Furthermore, according to the first embodiment, the generator 573 generates the second virtual image P10 representing a part of the external space of the moving body 2, by using a captured image or movie of past visited places individually captured by the driver U1 and the passenger U2 included in the action history information obtained by the acquisition unit 571 based on the position information of the moving body 2, the first identification information and the second identification information, and by using an avatar image and spatial information. This enables both the driver U1 and the passenger U2 to talk about their past memories of what they have experienced.

Furthermore, according to the first embodiment, the generator 573 generates the first virtual image and the second virtual image representing a part of the external space of the moving body 2 by using the avatar image acquired by the acquisition unit 571, the spatial information of the moving body 2, and at least one of the current or past landmark images. This enables both the driver U1 and the passenger U2 to talk about their past memories of what they have experienced.

Furthermore, according to the first embodiment, the generator 573 virtually represents the driver U1 included in the first virtual image by using an avatar or hologram, and virtually represents the passenger U2 included in the second virtual image by using an avatar or hologram. Due to this display of an avatar or a hologram, it is possible to virtually obtain a sense of unity between the users even when the image is not a real image.

Furthermore, according to the first embodiment, the generator 573 generates the first virtual image or the second virtual image based on the detection results individually obtained by the behavior sensor 32 of the first wearable device 30 and the behavior sensor 42 of the second wearable device 40. This makes it possible to realistically express the behaviors of the driver U1 and the passenger U2.

Furthermore, according to the first embodiment, the generator 573 detects the behavior of the driver U1 based on the image data detected by the imaging device 11 and generates the second virtual image based on the detection result. This makes it possible to realistically express the behavior of the driver U1 in the first virtual image.

Furthermore, according to the first embodiment, the generator 573 generates the first virtual image and the second virtual image from the image data generated by the imaging device 11 of the moving body 2 obtained by the acquisition unit 571 by using the spatial information regarding the internal space and the external space of the moving body 2. This makes it possible to realistically express the internal space and the external space of the moving body 2.

Although the passenger U2 sits in the passenger seat of the moving body 2 in the first embodiment, the passenger U2 may virtually sit in a seat desired by the passenger U2. In this case, the generator 573 may generate the first virtual image representing a state where the passenger U2 virtually sits in the seat desired by the passenger U2 as observed from the viewpoint of the driver U1, based on a designation signal designating the seat of the moving body 2 input from the operation unit 47 of the second wearable device 40.

Next, a second embodiment will be described. In the first embodiment described above, there is only one passenger who virtually rides in the moving body. In the second embodiment, a plurality of passengers virtually rides in the moving body. In the following, the configuration of the server according to the second embodiment will be described first, and thereafter processes executed by the server will be described. Note that components same as those in the display system 1 according to the first embodiment described above are labeled with the same reference signs, and detailed description of the duplicate components is omitted.

Figure 15:
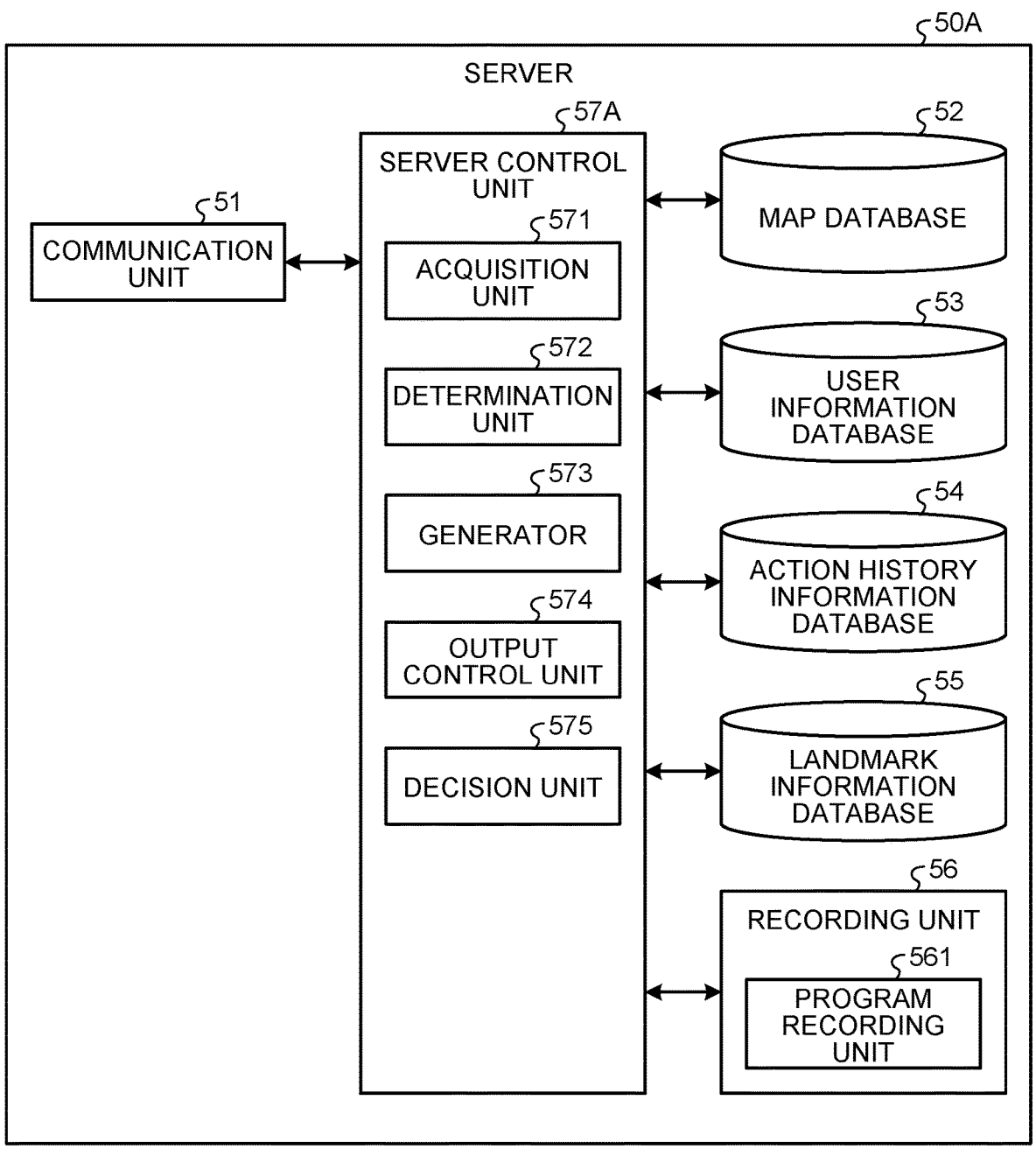
FIG. 15 is a block diagram illustrating a functional configuration of a server according to a second embodiment.

FIG. 15 is a block diagram illustrating a functional configuration of the server according to the second embodiment. A server 50A illustrated in FIG. 15 includes a server control unit 57A instead of the server control unit 57 according to the first embodiment described above.

The server control unit 57A includes memory and a processor including hardware such as a CPU. The server control unit 57A includes a decision unit 575 in addition to the configuration of the server control unit 57 according to the first embodiment described above.

The decision unit 575 decides a representative from among the plurality of passengers U2 based on a request signal transmitted from each of the plurality of second wearable devices 40.

Figure 16:
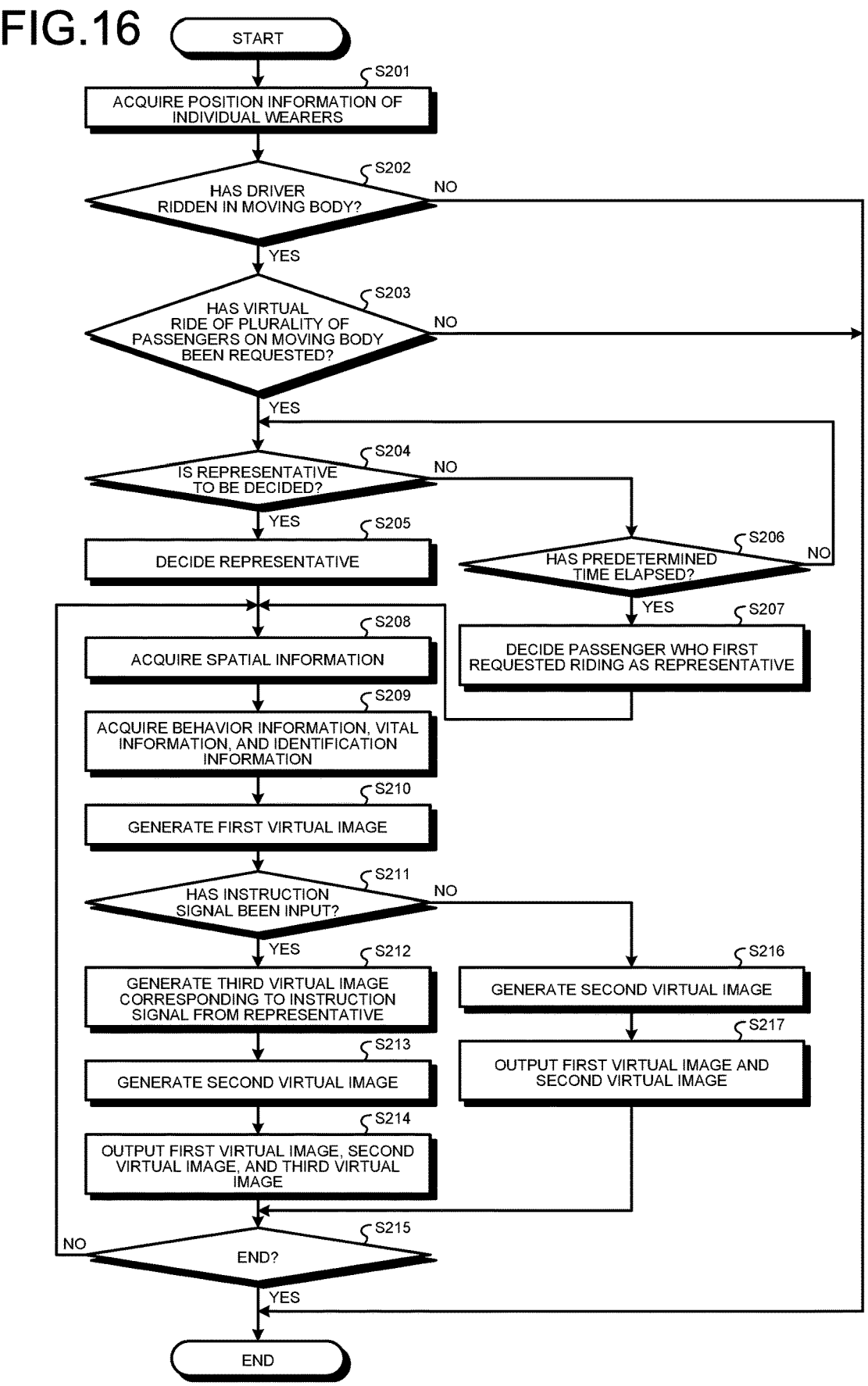
FIG. 16 is a flowchart illustrating an outline of processes executed by the server according to the second embodiment.

Next, processes executed by the server 50A will be described. FIG. 16 is a flowchart illustrating an outline of processes executed by the server 50A.

As illustrated in FIG. 16, first, the acquisition unit 571 acquires position information regarding individual wearers and the position information of the moving body 2 (step S201). Specifically, the acquisition unit 571 acquires the position information of the first wearable device 30, the position information of the plurality of second wearable devices 40 individually worn by the plurality of passengers U2, and the position information of the moving body 2.

Subsequently, the determination unit 572 determines whether the driver U1 has ridden in the moving body 2 based on the position information of the first wearable device 30 and the position information of the moving body 2 (step S202). In a case where the determination unit 572 determines that the driver U1 has ridden in the moving body (step S202: Yes), the server 50A proceeds to step S203 described below. In contrast, in a case where the determination unit 572 determines that the driver U1 has not ridden in the moving body 2 (step S202: No), the server 50A ends the present process.

In step S203, the determination unit 572 determines whether a request signal requesting the passenger U2's virtual ride in the moving body 2 has been input from the second wearable device 40 worn by each of the plurality of passengers U2. Here, the plurality of passengers U2 is at least two or more. When the determination unit 572 determines that the request signal requesting a virtual ride in the moving body 2 has been input from the second wearable device 40 worn by each of the plurality of passengers U2 (step S203: Yes), the server 50A proceeds to step S204 described below. In contrast, in a case where the determination unit 572 determines that the request signal requesting the passenger U2's virtual ride in the moving body 2 has not been input from the second wearable device 40 worn by each of the plurality of passengers U2 (step S203: No), the server 50A ends the present process.

In step S204, the determination unit 572 determines whether a decision signal to decide the representative of the passenger U2 has been input from the second wearable device 40 worn by each of the plurality of passengers U2. In a case where the determination unit 572 determines that the decision signal has been input (step S204: Yes), the server 50 proceeds to step S205 described below. In contrast, in a case where the determination unit 572 determines that the decision signal has not been input (step S204: No), the server 50 proceeds to step S206 described below.

In step S205, a representative is decided from among the plurality of passengers U2 based on a request signal transmitted from each of the plurality of second wearable devices 40. After step S205, the server 50A proceeds to step S208.

In step S206, the determination unit 572 determines whether a predetermined time has elapsed since the input of the request signal via each of the plurality of second wearable devices 40. For example, the determination unit 572 determines whether 60 seconds have elapsed since the input of the request signal via each of the plurality of second wearable devices 40. In a case where the determination unit 572 determines that a predetermined time has elapsed (step S206: Yes), the server 50A proceeds to step S207 described below. In contrast, in a case where the determination unit 572 determines that the predetermined time has not elapsed (step S206: No), the server 50A returns to step S204 described above.

In step S207, the decision unit 575 decides, as the representative, the passenger U2 wearing the second wearable device 40 who first transmitted the request signal, from among the plurality of passengers U2. After step S207, the server 50A proceeds to step S208.

Subsequently, the acquisition unit 571 acquires spatial information regarding the internal space and the external space of the moving body 2 (step S208).

Thereafter, the acquisition unit 571 acquires the behavior information, vital information, and identification information of the driver U1 and the plurality of passengers U2 (step S209). Although the acquisition unit 571 acquires the behavior information, vital information, and identification information of a plurality of passengers, the acquisition unit 571 may acquire only the behavior information, vital information, and identification information of the representative.

Subsequently, the generator 573 generates the first virtual image (step S210). Specifically, the generator 573 generates the first virtual image representing a state where the representative who is the passenger U2 virtually rides in the moving body 2 as observed from the viewpoint of the driver U1, the first virtual image reflecting the behavior information of the representative (for example, refer to FIG. 9 described above).

Thereafter, the determination unit 572 determines whether an instruction signal instructing generation of an image to be displayed on the second wearable device 40 of each of the passengers U2, which is an image of a region-of-interest that is to be focused in the driving operation of the driver U1, has been input from the operation unit 47 of the second wearable device 40 worn by the representative (step S211). In a case where the determination unit 572 determines that the instruction signal has been input from the second wearable device 40 worn by the representative (step S211: Yes), the server 50A proceeds to step S212 described below. In contrast, in a case where the determination unit 572 determines that the instruction signal has not been input from the second wearable device 40 worn by the representative (step S211: No), the server 50A proceeds to step S216 described below.

In step S212, the generator 573 generates a third virtual image corresponding to an instruction signal instructing generation of an image to be displayed on the second wearable device 40 of each of the passengers U2, which is an image of a region-of-interest that is to be focused in the driving operation of the driver U1, sent from the operation unit 47 of the second wearable device 40 worn by the representative.

Figure 17:
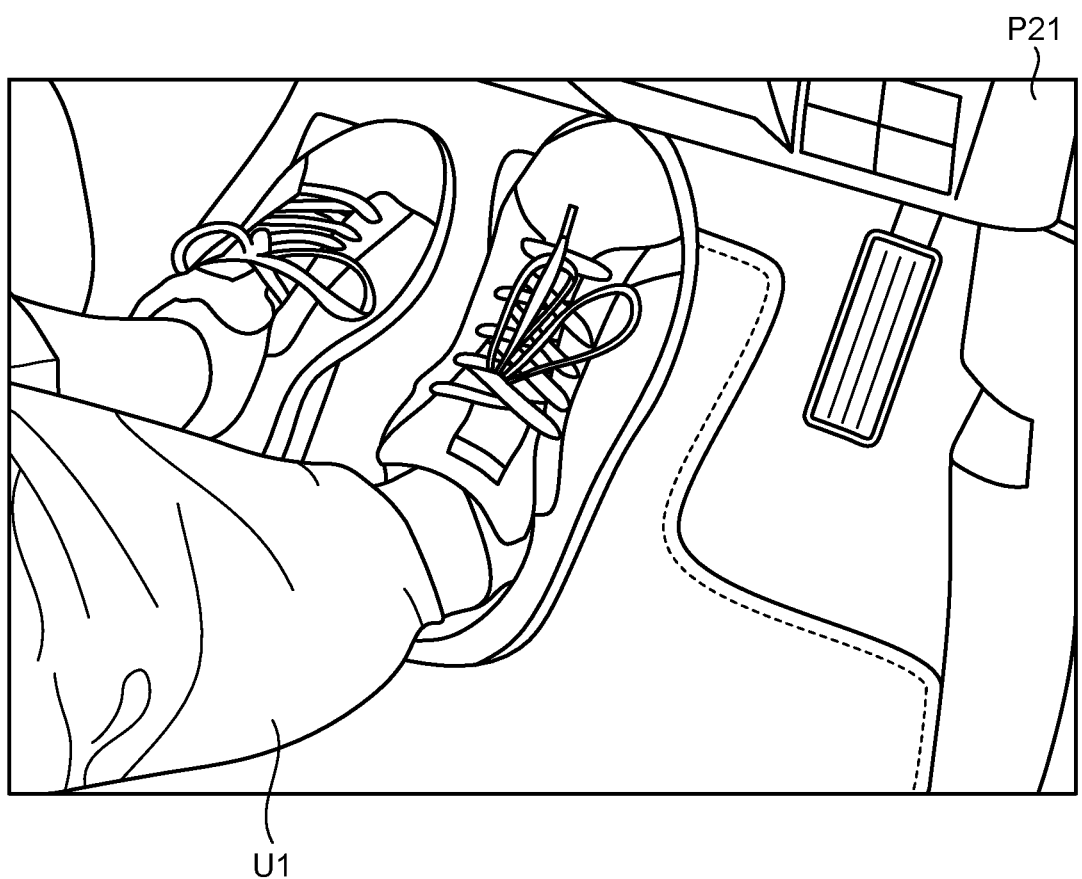
FIG. 17 is a view schematically illustrating an example of a third virtual image generated by a generator according to the second embodiment.

FIG. 17 is a view schematically illustrating an example of the third virtual image generated by the generator 573. The following will describe a case where the instruction signal input from the operation unit 47 of the second wearable device 40 worn by the representative designates an accelerator pedal operation of the driver U1 as a region-of-interest. In this case, as illustrated in FIG. 17, the generator 573 generates a third virtual image P21 enlarged while focusing on the portion of the accelerator pedal operated by the driver U1, the third virtual image P21 reflecting the operation of the driver U1. This enables each of the passengers U2 to virtually observe operating techniques of the driver U1 in real time. Furthermore, each of the passengers U2 may simulate experience of using operation techniques of the driver U1. After step S212, the server 50A proceeds to step S213 described below.

Returning to FIG. 16, the description of step S213 and subsequent steps will be continued.

In step S213, using the spatial information of the moving body 2 acquired by the acquisition unit 571, the generator 573 generates a second virtual image representing a state where the driver U1 rides in the moving body as observed from the viewpoint of the representative, the second virtual image reflecting the behavior of the driver U1 and virtually representing the external space of the moving body 2.

Subsequently, the output control unit 574 outputs the first virtual image generated by the generator 573 to the first wearable device 30 worn by the driver U1, outputs the second virtual image generated by the generator 573 to the second wearable device 40 worn by the representative, and outputs the third virtual image generated by the generator 573 to the second wearable device 40 worn by each of the passengers U2 other than the representative (step S214). Although the output control unit 574 outputs the second virtual image generated by the generator 573 to the second wearable device 40 worn by the representative, the output control unit 574 may output the third virtual image generated by the generator 573, instead of the second virtual image, to the second wearable device 40 worn by the representative. In this case, the output control unit 574 preferably outputs at least one of the second virtual image or the third virtual image to the second wearable device 40 worn by the representative in accordance with the instruction signal input from the second wearable device 40 worn by the representative.

In a case where the generator 573 has generated the second virtual image corresponding to the instruction signal instructing the generation of the image of the region-of-interest to be focused in the driving operation of the driver U1, the output control unit 574 may output the audio data emitted by the driver U1 and the representative to the second wearable device 40 worn by another passenger U2. Furthermore, the output control unit 574 may convert the audio data emitted by the driver U1 and the representative into text data for the second wearable device 40 worn by the other passenger U2, superimpose the text data on the second virtual image, and may output the result to the second wearable device 40 worn by each of the passengers U2. This enables each of the passengers U2 to confirm the representative's explanation of operation of the driver U1 by text or sound, leading to deeper understanding of the operation technique of the driver U1 as compared with the case where the information is provided by images alone.

Moreover, in a case where the other passenger U2 utters a voice or a sound, in addition to the representative and the driver U1, the output control unit 574 may output the audio data or text data corresponding to the voice or sound uttered by the passenger U2 to the second wearable device 40 worn by each of the passengers U2 and the first wearable device 30 worn by the driver U1. This enables the representative and each of the passengers U2 to virtually perform question-and-answer session about the operation of the moving body 2 while viewing the second virtual image, leading to deeper understanding of the operation details of the driver U1.

Thereafter, in a case where an instruction signal instructing ending has been input from the first wearable device 30 worn by the occupant or the second wearable device 40 worn by the representative (step S215: Yes), the server 50A ends the present process. In contrast, when the instruction signal instructing ending has not been input from the first wearable device 30 worn by the occupant or the second wearable device 40 worn by the representative (step S215: No), the server 50A returns to step S208 described above.

In step S216, the generator 573 generates the second virtual image (refer to FIG. 10 described above).

Subsequently, the output control unit 574 outputs the first virtual image generated by the generator 573 to the first wearable device 30 worn by the driver U1 and outputs the second virtual image generated by the generator 573 to the second wearable device 40 worn by the representative and each of the passengers U2 (step S217).

According to the second embodiment described above, the generator 573 generates the third virtual image based on the instruction signal input from the second wearable device 40 to instruct generation of an image of the region-of-interest to be focused in the driving operation of the driver U1, the spatial information of the internal space of the moving body 2, and on the behavior of the driver U1, and then the generator 573 outputs the generated third virtual image to the second wearable device 40 worn by each of the passengers U2. Accordingly, each of the passengers U2 may intuitively understand the driving operation of the driver U1.

Furthermore, according to the second embodiment, since the generator 573 generates the first virtual image viewed from the viewpoint of the driver U1 in the state where the representative virtually rides in the moving body 2, it is possible to obtain the sense of unity between the driver U1 and the representative.

In the second embodiment, the generator 573 generates the first virtual image viewed from the viewpoint of the driver U1 in a state where the representative virtually rides in the moving body 2, the image reflecting the behavior information of the representative. The present disclosure is not limited to this and the generator 573 may generate the first virtual image in which a plurality of passengers U2 virtually sits in the moving body 2. In this case, the generator 573 generates the first virtual image in which each of the plurality of passengers virtually sits from the passenger seat to the back seats in the order of the request signal input from each of the plurality of second wearable devices 40. This makes it possible to further enhance the sense of unity.

Next, a third embodiment will be described. While the above-described first and second embodiments are cases having one moving body, the third embodiment has a driver on each of a plurality of moving bodies. Furthermore, the server according to the third embodiment has the same configuration as the server 50 of the above-described first embodiment, while the process executed by the server has a difference. Hereinafter, processes executed by the server according to the third embodiment will be described. Note that components same as those in the display system 1 according to the first embodiment described above are labeled with the same reference signs, and detailed description of the duplicate components is omitted.

Figure 18:
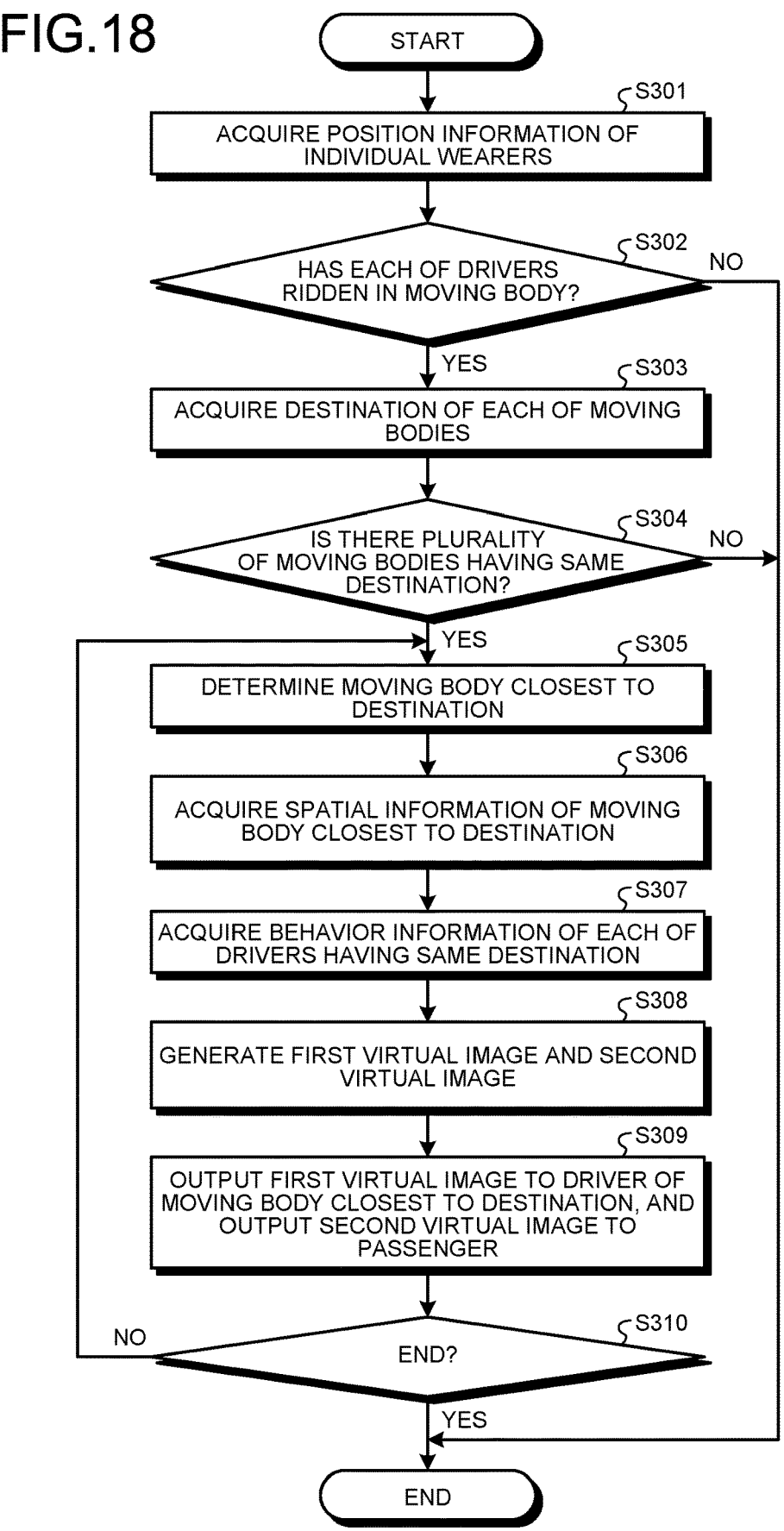
FIG. 18 is a flowchart illustrating an outline of processes executed by a server according to a third embodiment.

FIG. 18 is a flowchart illustrating an outline of processes executed by the server 50 according to the third embodiment.

As illustrated in FIG. 18, first, the acquisition unit 571 acquires position information of each of wearers (step S301). Specifically, the acquisition unit 571 acquires the position information of the first wearable device 30, the position information of the second wearable device 40, and the position information of the plurality of moving bodies (step S301).

Subsequently, based on the position information of the first wearable device 30 worn by the driver U1, the position information of the second wearable device 40 worn by the passenger U2, and the position information of each of the plurality of moving bodies 2, the determination unit 572 determines whether the driver U1 and the passenger U2 have ridden in mutually different moving bodies 2 (step S302). In a case where the determination unit 572 determines that the driver U1 and the passenger U2 have ridden in mutually different moving bodies 2 (step S302: Yes), the server 50 proceeds to step S303 described below. In contrast, in a case where the determination unit 572 determines that the driver U1 and the passenger U2 have not ridden in mutually different moving bodies 2 (step S302: No), the server 50 ends the present process.

In step S303, the acquisition unit 571 acquires the destination set by each of the plurality of moving bodies 2 using the car navigator 17.

Subsequently, the determination unit 572 determines whether there is a plurality of moving bodies 2 having the same destination, based on individual destinations of the plurality of moving bodies 2 (step S304). In a case where the determination unit 572 determines that there is a plurality of moving bodies 2 having the same destination (step S304: Yes), the server 50 proceeds to step S305 described below. In contrast, in a case where the determination unit 572 determines that there is not a plurality of moving bodies 2 having the same destination (step S304: No), the server 50 ends the present process.

In step S305, the determination unit 572 determines the moving body 2 closest to the destination based on the position information of each of the plurality of moving bodies 2 having the same destination.

Figure 19:
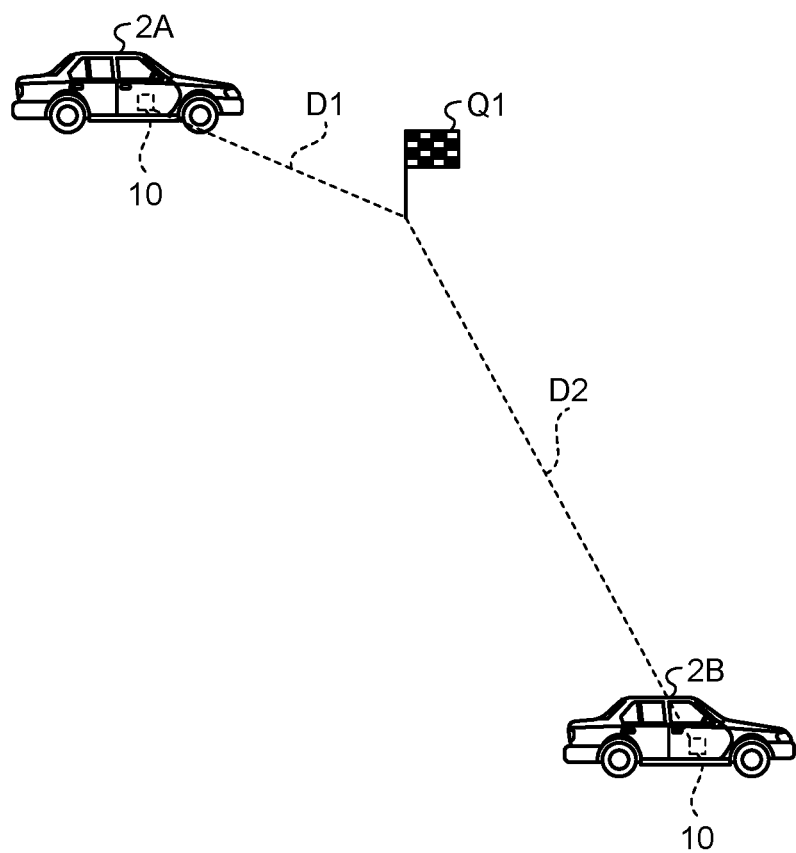
FIG. 19 is a view schematically illustrating current positions of a plurality of moving bodies having a same destination.

FIG. 19 is a view schematically illustrating current positions of a plurality of moving bodies 2 having a same destination. In FIG. 19, two mutually different moving bodies 2 are described as a moving body 2A and a moving body 2B. Furthermore, the distance between the destination Q1 and the current position of the moving body 2A and the distance between the destination Q1 and the current position of the moving body 2B are expressed as D1 and D2 (distance D1<distance D2) respectively. In FIG. 19, two moving bodies 2 will be described for simplicity of description. However, the number of moving bodies 2 is not limited and it is allowable as long as the number is two or more. Furthermore, for simplicity of description, the following will assume that the driver U1 wearing the first wearable device 30 rides in the moving body 2A while the passenger U2 wearing the second wearable device 40 rides in the moving body 2B.

As illustrated in FIG. 19, the determination unit 572 determines the moving body 2 closest to the destination Q1 based on the position information of the moving bodies 2A and 2B having the same destination Q1. In the case illustrated in FIG. 19, the determination unit 572 determines the moving body 2A as the moving body 2 closest to the destination Q1.

Returning to FIG. 18, the description of step S306 and subsequent steps will be continued.

In step S306, the acquisition unit 571 acquires spatial information of the moving body 2A closest to the destination via the network 60 and the communication unit 51.

Subsequently, the acquisition unit 571 acquires, from the second wearable device 40, the behavior information of the drivers who is the passengers U2 having the same destination (step S307).

Thereafter, the generator 573 generates the first virtual image and the second virtual image (step S308). Specifically, the generator 573 generates the first virtual image as observed from the viewpoint of the driver U1 in a state where the passenger U2 of the moving body 2B virtually rides in the moving body 2A closest to the destination, the second virtual image reflecting the behavior of the passenger U2. Furthermore, the generator 573 generates the second virtual image viewed from the viewpoint of the passenger U2 in a state where the driver U1 virtually rides in the moving body 2A closest to the destination, the second virtual image reflecting the behavior information of the driver U1 and expressing the external space of the moving body 2A closest to the destination.

Subsequently, the output control unit 574 outputs the first virtual image generated by the generator 573 to the first wearable device 30 worn by the driver U1 riding in the moving body 2A closest to the destination, and outputs the second virtual image to the second wearable device 40 worn by the passenger U2 riding in the moving body 2B having the same destination (step S309).

Thereafter, when all the moving bodies 2 have arrived at the destination (step S310: Yes), the server 50 ends the present process. In contrast, when all the moving bodies 2 have not arrived at the destination (step S310: No), the server 50 returns to step S305 described above.

According to the third embodiment described above, in a case where the destination of the moving body 2 and the destination of the other moving body 2 are the same, the output control unit 574 outputs the first virtual image to the first wearable device 30 worn by the driver U1 and outputs the second virtual image to the second wearable device 40 worn by the passenger U2 riding in the other moving body 2. Accordingly, it is possible to travel with the sense of unity between the users even when the users ride in different moving bodies 2 when traveling.

Furthermore, according to the third embodiment, the output control unit 574 outputs the first virtual image to the first wearable device 30 worn by the driver U1 riding in the moving body 2 closest to the destination, and outputs the second virtual image to the second wearable device 40 worn by the passenger U2 other than the driver U1. Accordingly, the users may share the virtual race experience toward the destination.

In the third embodiment, the driver U1 wearing the first wearable device 30 rides in the moving body 2A closest to the destination while the passenger U2 wearing the second wearable device 40 rides in the moving body 2B. However, when the moving body 2B moves to the position closer to the destination compared with the moving body 2A due to traffic conditions, the generator 573 may generate the first virtual image as observed from the viewpoint of the passenger U2 in a state where the driver U1 virtually rides in the moving body 2B while generating the second virtual image as observed from the viewpoint of the driver U1 in a state where the passenger U2 rides in the moving body 2B. In this case, the output control unit 574 outputs the first virtual image to the second wearable device 40 and outputs the second virtual image to the first wearable device 30. This allows the users to share a virtual race experience toward the destination.

Next, a fourth embodiment will be described. The above-described third embodiment is a case where each of the plurality of moving bodies moves from mutually different locations toward the destination. In the fourth embodiment, however, a plurality of moving bodies moves in a state of being coupled to each other. Furthermore, a server according to the fourth embodiment has the same configuration as the server 50 of the above-described first embodiment, while the process executed by the server has a difference. Hereinafter, processes executed by the server according to the fourth embodiment will be described. Note that components same as those in the display system 1 according to the first embodiment described above are labeled with the same reference signs, and detailed description of the duplicate components is omitted.

Figure 20:
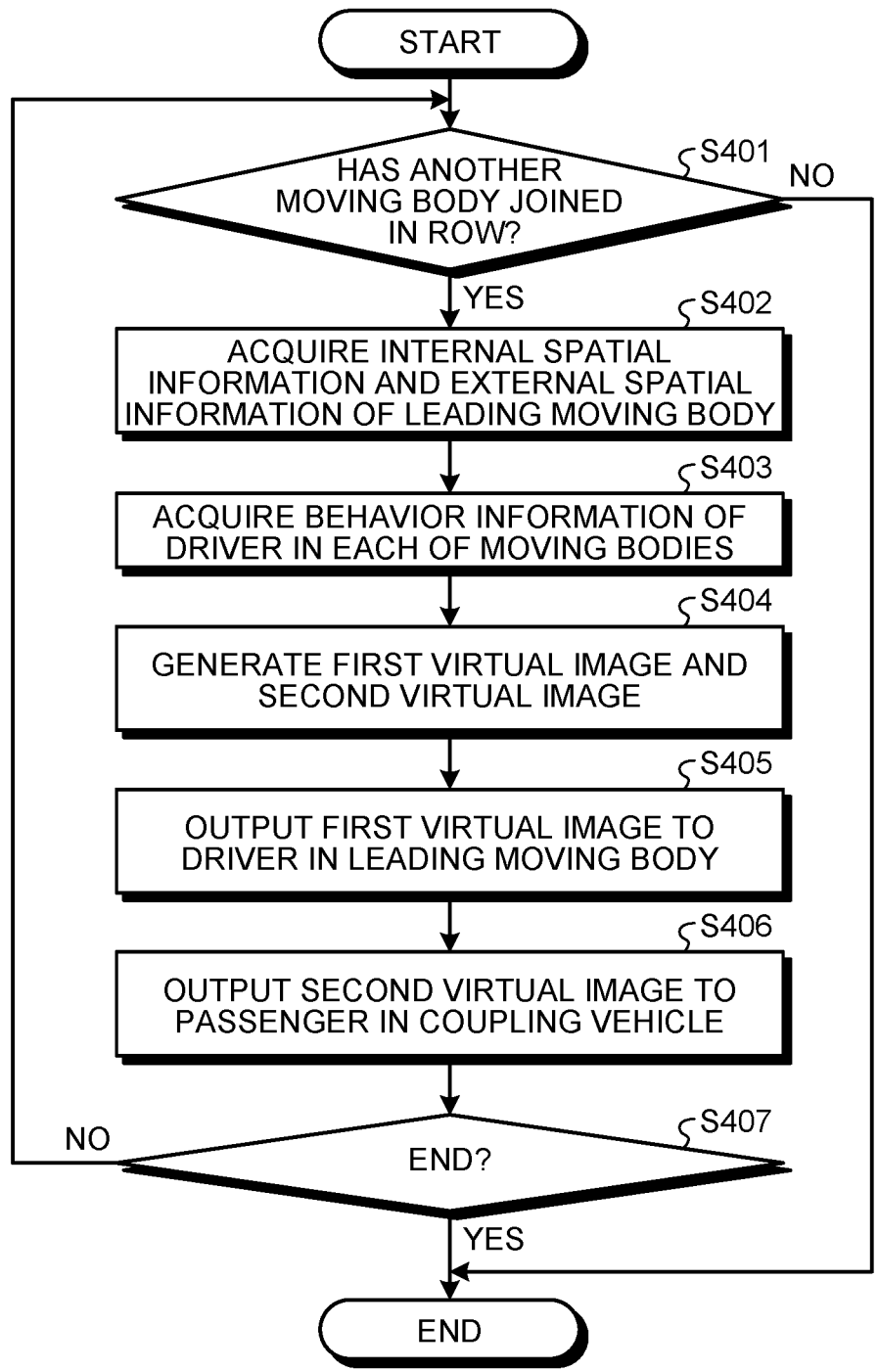
FIG. 20 is a flowchart illustrating an outline of processes executed by a server according to a fourth embodiment.

FIG. 20 is a flowchart illustrating an outline of processes executed by the server 50 according to the fourth embodiment.

As illustrated in FIG. 20, first, the determination unit 572 determines whether another moving body 2 (hereinafter, referred to as a "coupling vehicle") has been coupled to the moving body 2 on which the occupant rides (whether another moving body 2 has been joined in the row), via the network 60 and the communication unit 51 (step S401). In a case where the determination unit 572 determines that the coupling vehicle has been coupled to the moving body 2 (step S401: Yes), the server 50 proceeds to step S402 described below. In contrast, in a case where the determination unit 572 determines that the coupling vehicle is not coupled to the moving body 2 (step S401: No), the server 50 ends the present process.

Figure 21:
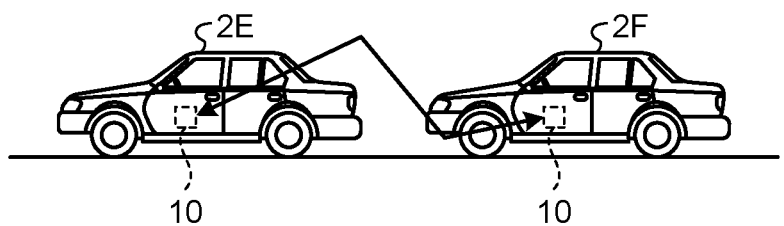
FIG. 21 is a view schematically illustrating a situation in association with a coupling vehicle coupled to a leading vehicle.

FIG. 21 is a view schematically illustrating a situation in association with the moving body 2 and a coupling vehicle coupled to the moving body 2. In FIG. 21, the leading moving body 2 is represented as a leading vehicle 2E, and the moving body 2 coupled to the leading vehicle 2E is represented as a coupling vehicle 2F. In the following, it is assumed that the driver U1 wearing the first wearable device 30 rides in the leading vehicle 2E and that the passenger U2 wearing the second wearable device 40 rides in the coupling vehicle 2F.

As illustrated in FIG. 21, the determination unit 572 determines whether the information indicating that the coupling vehicle 2F has been coupled to the leading vehicle 2E by inter-vehicle communication on the leading vehicle 2E to the coupling vehicle 2F, has been input from the leading vehicle 2E via the network 60 and the communication unit 51. The determination unit 572 may determine whether the leading vehicle 2E and the coupling vehicle 2F have been coupled to each other based on the position information of the leading vehicle 2E and the position information of the coupling vehicle 2F via the network 60 and the communication unit 51.

Returning to FIG. 20, the description of step S402 and subsequent steps will be continued.

In step S402, the acquisition unit 571 acquires spatial information of the leading vehicle 2E being the head of the row.

Subsequently, the acquisition unit 571 acquires the behavior information of each of occupants from the first wearable device 30 worn by the individual occupants in the leading vehicle 2E and the coupling vehicle 2F (step S403).

Thereafter, the generator 573 generates the first virtual image and the second virtual image (step S404). Specifically, the generator 573 generates a first virtual image of the state in which the passenger U2 of the coupling vehicle 2F virtually rides in the leading vehicle 2E from the viewpoint of the driver U1, the first virtual image reflecting the behavior of the passenger U2 of the coupling vehicle 2F. Furthermore, the generator 573 generates a second virtual image representing a state where the driver U1 of the leading vehicle 2E rides in the leading vehicle 2E as observed from the viewpoint of the passenger U2, the second virtual image reflecting the behavior of the driver U1 and virtually representing the external space of the leading vehicle 2E.

Subsequently, the output control unit 574 outputs the first virtual image to the first wearable device 30 worn by the driver U1 of the leading vehicle 2E via the network 60 and the communication unit 51 (step S405), and outputs the second virtual image to the second wearable device 40 worn by the passenger U2 of the coupling vehicle 2F (step S406).

Thereafter, the coupling vehicle 2F coupled to the leading vehicle 2E is disconnected to end the process (step S407: Yes), the server 50 ends the present process. In contrast, in a case where the coupling vehicle 2F coupled to the leading vehicle 2E is not disconnected (step S407: No), the server 50 returns to step S401 described above.

According to the fourth embodiment described above, in a case where the determination unit 572 determines that the coupling vehicle 2F is coupled to the leading vehicle 2E, the output control unit 574 outputs the second virtual image generated by the generator 573 to the second wearable device 40 worn by the passenger U2 riding in the coupling vehicle 2F connected to the leading vehicle 2E, and outputs the first virtual image to the first wearable device 30 worn by the driver U1 riding in the leading vehicle 2E. Accordingly, it is possible to travel while the driver U1 riding in the leading vehicle 2E is guiding, as a leader, the passenger U2 riding in the coupling vehicle 2F, enabling acquisition of a sense of unity between the users.

In the fourth embodiment, the determination unit 572 determines whether the leading vehicle 2E and the coupling vehicle 2F are coupled to each other. However, the leading vehicle 2E and the coupling vehicle 2F do not need to be physically coupled. Instead, for example, the determination unit 572 may determine whether the leading vehicle 2E and the coupling vehicle 2F are traveling in a row while keeping a certain distance. That is, the determination unit 572 may determine whether the leading vehicle 2E and the coupling vehicle 2F are traveling in a row while maintaining a constant distance. In this case, the determination unit 572 may determine whether the leading vehicle 2E and the coupling vehicle 2F are traveling in a row based on the position information and the destination of the leading vehicle 2E and the position information and the destination of the coupling vehicle 2F via the network 60 and the communication unit 51. Specifically, in a case where the destinations of the leading vehicle 2E and the coupling vehicle 2F are the same and the distance based on the position information of the leading vehicle 2E and the position information of the coupling vehicle 2F is a constant distance, the determination unit 572 determines that the leading vehicle is 2E and the coupling vehicle 2F are traveling in a row. For example, when the distance between the leading vehicle 2E and the coupling vehicle 2F is 45 m or less in a case where the destinations of the leading vehicle 2E and the coupling vehicle 2F are the same and the leading vehicle 2E and the coupling vehicle 2F are each traveling at 60 km/h, the determination unit 572 determines that the leading vehicle 2E and the coupling vehicle 2F are traveling in a row. The determination unit 572 may determine, as a matter of course, whether information indicating that the leading vehicle 2E and the coupling vehicle 2F traveling in a row has been input from the leading vehicle 2E by inter-vehicle communication performed on the leading vehicle 2E with the coupling vehicle 2F. In this case, when the determination unit 572 has determined that the leading vehicle 2E and the coupling vehicle 2F are traveling in a row, the output control unit 574 outputs the second virtual image generated by the generator 573 to the second wearable device 40 worn by the passenger U2 riding in the coupling vehicle 2F that is following the leading vehicle 2E, and outputs the first virtual image to the first wearable device 30 worn by the driver U1 riding in the leading vehicle 2E. With this configuration, even when the leading vehicle 2E and the coupling vehicle 2F are not coupled to each other, the driver U1 riding in the leading vehicle 2E may travel, as a leader, while guiding the passenger U2 riding in the coupling vehicle 2F in the case of traveling in a row, making it possible to obtain a sense of unity between the users.

Next, a fifth embodiment will be described. In the above-described first to fourth embodiments, the server control unit provided in the server functions as an image processing apparatus. However, in the fifth embodiment, the driving support device mounted on a moving body functions as the image processing apparatus and transmits the first virtual image to the first wearable device and transmits the second virtual image to the second wearable device. Hereinafter, the configuration of a driving support device according to the fifth embodiment will be described. Note that components same as those in the display system 1 according to the first to fourth embodiments described above are labeled with the same reference signs, and detailed description of the duplicate components is omitted.

Figure 22:
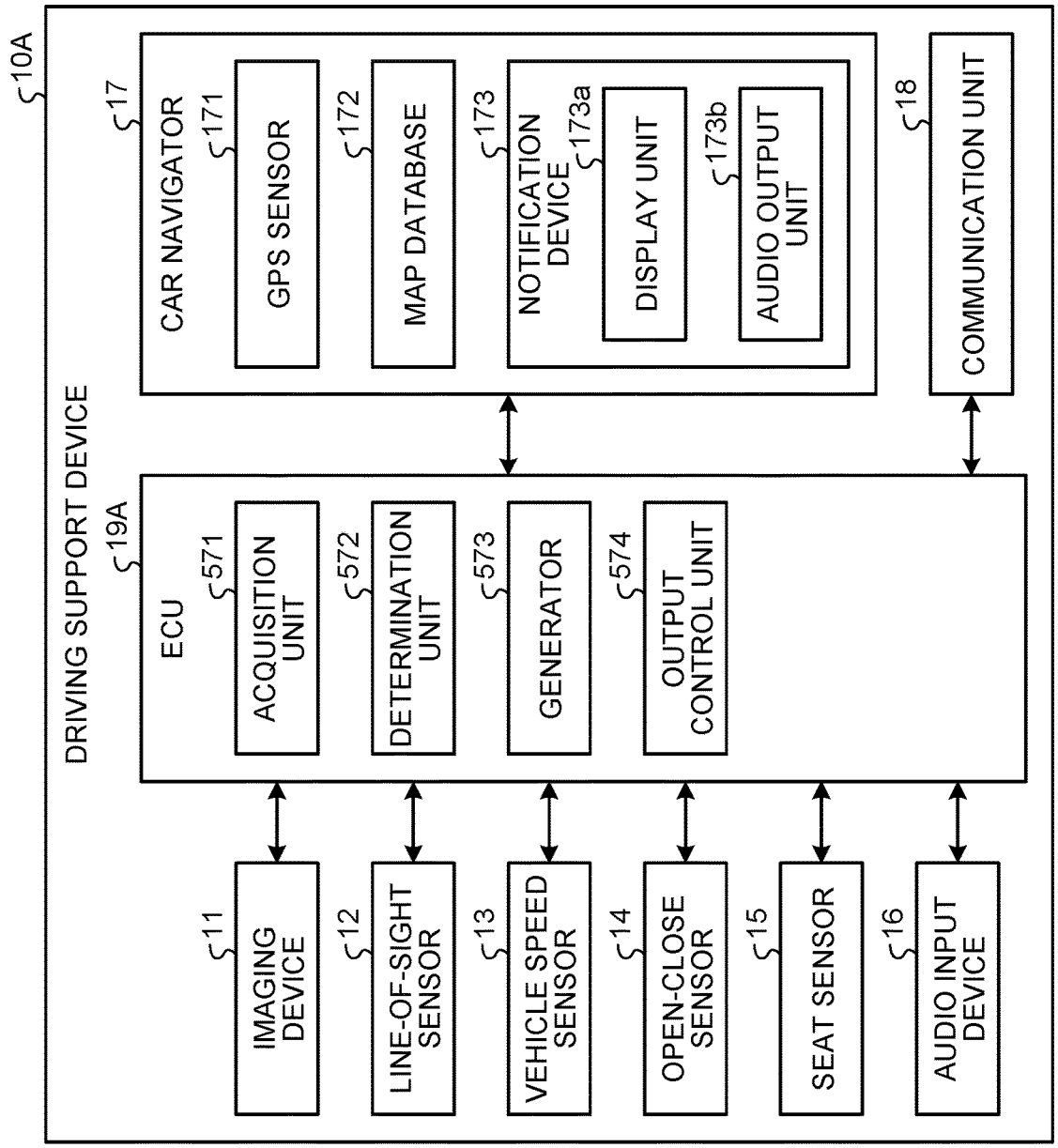
FIG. 22 is a block diagram illustrating a functional configuration of a driving support device according to a fifth embodiment.

FIG. 22 is a block diagram illustrating a functional configuration of a driving support device according to the fifth embodiment. A driving support device 10A illustrated in FIG. 22 includes an ECU 19A instead of the ECU 19 of the driving support device 10 according to the first embodiment described above.

The ECU 19A includes memory and a processor including some sort of hardware such as a CPU, a GPU, an FPGA, a DSP, and an ASIC. The ECU 19A includes the acquisition unit 571, the determination unit 572, the generator 573, and the output control unit 574 described above. In the fifth embodiment, the ECU 19A functions as a processor of the image processing apparatus.

According to the fifth embodiment described above, since the output control unit 574 outputs the first virtual image generated by the generator 573 to the first wearable device 30, it is possible to obtain a sense of unity between the users.

Next, a sixth embodiment will be described. In the sixth embodiment, the first wearable device functions as an image processing apparatus. The configuration of the first wearable device according to the sixth embodiment will be described below. Note that components same as those in the display system 1 according to the first to fourth embodiments described above are labeled with the same reference signs, and detailed description of the duplicate components is omitted.

Figure 23:
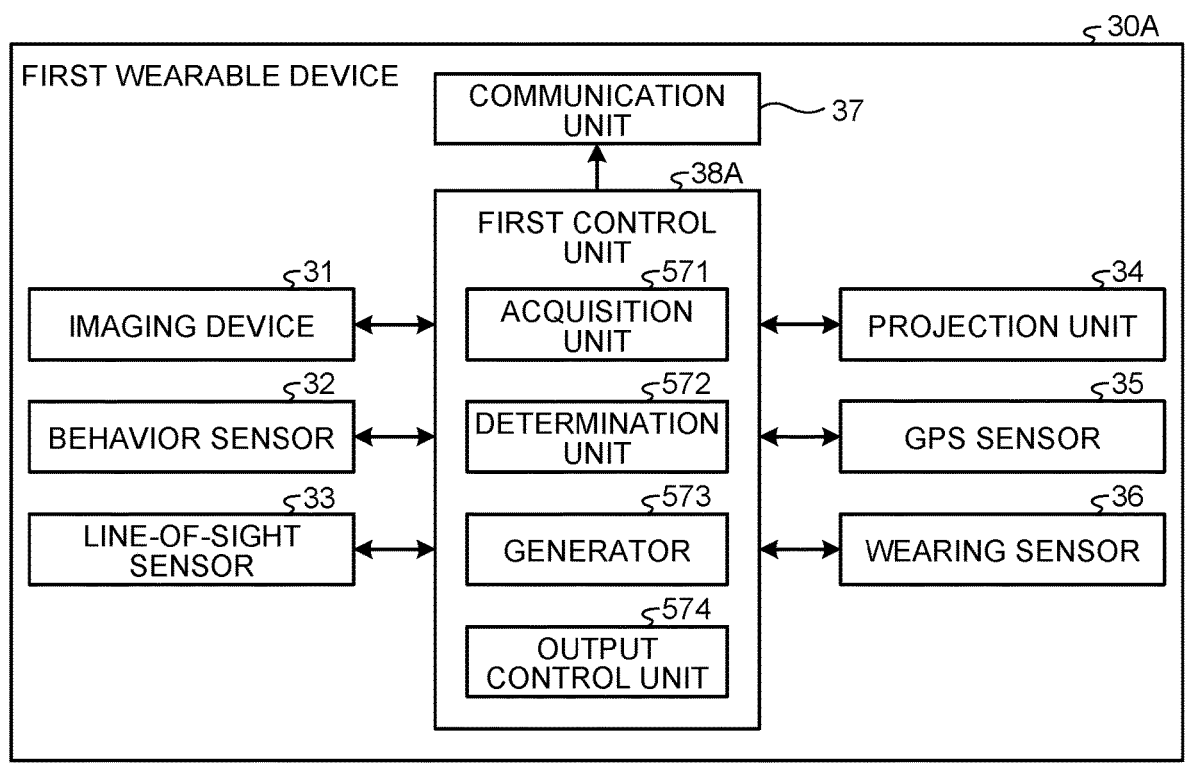
FIG. 23 is a block diagram illustrating a functional configuration of a first wearable device according to a sixth embodiment.

FIG. 23 is a block diagram illustrating a functional configuration of the first wearable device according to the sixth embodiment. A first wearable device 30A illustrated in FIG. 23 includes a first control unit 38A instead of the first control unit 38 according to the first embodiment described above.

The first control unit 38A includes memory and a processor including some sort of hardware such as a CPU, a GPU, an FPGA, a DSP, and an ASIC. The first control unit 38A includes the acquisition unit 571, the determination unit 572, the generator 573, and the output control unit 574 described above. In the sixth embodiment, the first control unit 38A functions as a processor of the image processing apparatus.

According to the sixth embodiment described above, the output control unit 574 outputs the first virtual image to first wearable device 30, making it possible to obtain a sense of unity between the users.

In the sixth embodiment described above, the first control unit 38A of the first wearable device 30A includes the acquisition unit 571, the determination unit 572, the generator 573, and the output control unit 574 described above. However, the functions of the acquisition unit 571, the determination unit 572, the generator 573, and the output control unit 574 described above may be provided in the second control unit 49 of the second wearable device 40, for example.

Figure 24:
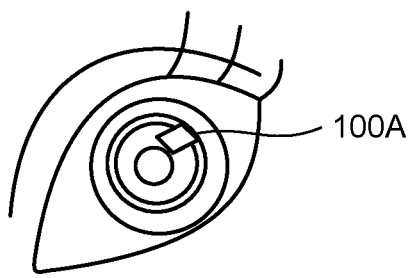
FIG. 24 illustrates a schematic configuration of a wearable device according to other embodiments.
Figure 25:
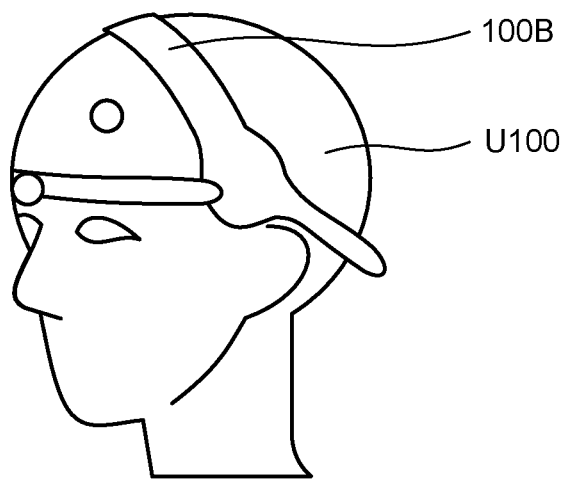
FIG. 25 illustrates a schematic configuration of a wearable device according to other embodiments.
Figure 26:
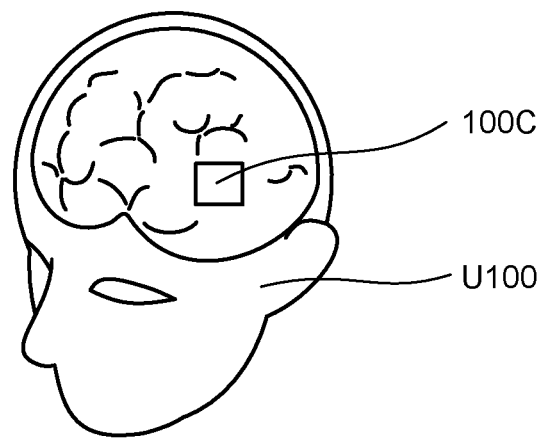
FIG. 26 illustrates a schematic configuration of a wearable device according to other embodiments.
Figure 27:
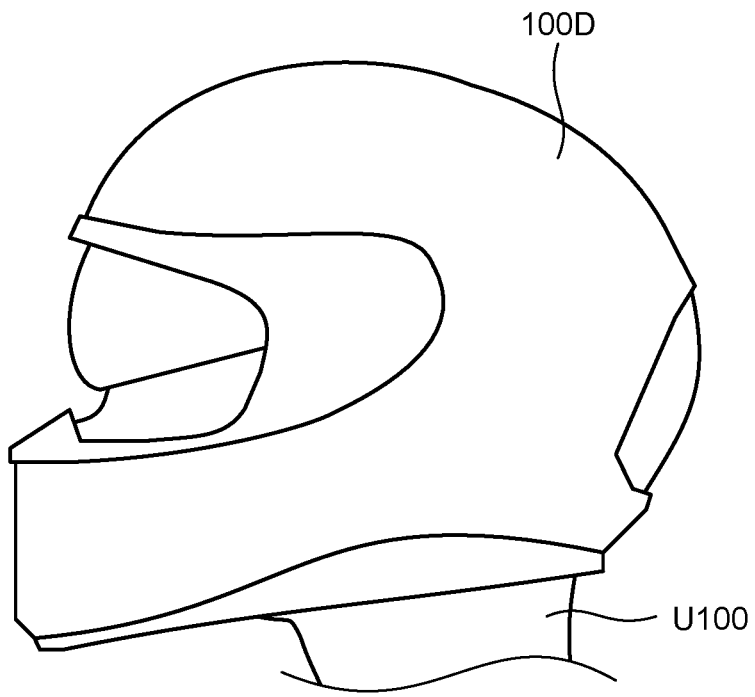
FIG. 27 illustrates a schematic configuration of a wearable device according to other embodiments.

Although the first to sixth embodiments are an example of using the eyeglass-type wearable device that may be word by the user. However, the present disclosure is not limited to this and may be applied to various wearable devices. For example, as illustrated in FIG. 24, the present disclosure may be applied to a contact-lenses-type wearable device 100A having an imaging function. Furthermore, the present disclosure may also be applied to a wearable device 100B in FIG. 25 and may even be applied to a device that directly communicates with the brain of a user U100 such as a brain chip type wearable device 100C as illustrated in FIG. 26. Furthermore, it is also allowable to use a helmet-like device including a visor, such as a wearable device 100D in FIG. 27. In this case, the wearable device 100D may be configured to project and display an image on the visor.

Moreover, while the first to sixth embodiments are an example in which the first wearable device projects an image to the retina of the occupant (driver) to let the occupant (driver) visually recognize the image, the image may be projected and displayed on a lens of eyeglass or the like.

In addition, in the first to sixth embodiments, the above-described "units" may be replaced with "circuits" or the like. For example, the first control unit may be replaced with a first control circuit.

Furthermore, the programs to be executed by the driving support device and the first wearable device, the second wearable device, and the server according to the first to sixth embodiments are provided as file data of an installable format or an executable format in a state of being stored in a computer-readable recording medium such as a CD-ROM, flexible disk (FD), CD-R, Digital Versatile Disk (DVD), USB medium, flash memory or the like.

Furthermore, the program to be executed by the driving support device, the first wearable device, the second wearable device, and the server according to the first to sixth embodiments may be stored on a computer connected to a network such as the Internet and configured to be downloaded via the network to be provided.

In the description of the flowcharts in the present specification, although the expressions "first", "next", "subsequently", or the like are used to clarify a processing order of the steps, the processing order to carry out the present embodiments shall not be defined uniquely by these expressions. That is, the processing order in each of the flowcharts described in the present specification may be changed unless it is inconsistent.

Although several embodiments of the present application have been described above in detail with reference to the drawings, these embodiments are illustrative only, and the present disclosure may be embodied in other ways by modifying or improving the embodiments described in the section of the present disclosure in various ways based on knowledge of those skilled in the art.

According to the present disclosure, in a case where the second wearer who wears the second wearable device virtually rides in the moving body, the processor generates the first virtual image representing a state where the second wearer virtually rides in the moving body as observed from a viewpoint of the first wearer, the first virtual image reflecting the behavior of the second wearer, and the processor then outputs the generated first virtual image to the first wearable device. This makes it possible to obtain a sense of unity between the users.

In some embodiments, the processor outputs the second virtual image to the second wearable device worn by the second wearer who virtually rides in the moving body, and this enables the second wearer to virtually experience riding in the moving body without actually riding in the moving body, making it possible to generate a sense of unity between the two users.

In some embodiments, the processor generates the first virtual image in a case where the first wearer faces the direction in which the second wearer virtually sits in the moving body, enabling the first wearer to concentrate on the driving.

In some embodiments, the processor individually generates the first virtual image and the second virtual image representing a part of the external space of the moving body using the captured image or movie included in the action history information. This enables the first wearer and the second wearer to talk about their past memories of what they have experienced.

In some embodiments, the processor individually generates the first virtual image and the second virtual image representing a part of the external space of the moving body using at least one of the current or past landmark images. This enables the first wearer and the second wearer to talk about their past memories of what they have experienced.

In some embodiments, the processor generates a third virtual image that virtually represents the driving operation of the first wearer in the region-of-interest in the driving operation of the first wearer, based on the instruction signal that instructs the generation of the image of the region-of-interest in the driving operation of the first wearer, based on the spatial information of the internal space of the moving body, and based on the first wearer, and then, outputs the generated third virtual image to the second wearable device. Accordingly, the second wearer may intuitively understand the driving operation of the first wearer.

In some embodiments, the processor generates the first virtual image in which the representative decided from among the second wearer and the plurality of third wearers virtually rides in the moving body. This makes it possible for the first wearer and the representative to obtain a sense of unity and possible for the plurality of second wearers to intuitively understand the driving operation of the first wearer.

In some embodiments, in a case where the destination of the moving body on which the first wearer rides and another moving body on which the second wearer rides is the same, the processor outputs the first virtual image to the first wearable device worn by the first wearer and outputs the second virtual image to the second wearable device worn by the second wearer. Accordingly, it is possible to travel with the sense of unity between the users even when the users are traveling separately.

In some embodiments, in a case where another moving body on which the second wearer rides is closer to the destination compared to the moving body on which the first wearer rides, the processor outputs the first virtual image instead of the second virtual image, to the second wearable device worn by the second wearer, and outputs the second virtual image instead of the first virtual image to the first wearable device worn by the first wearer. Accordingly, it is possible to share a virtual race experience toward the destination between the users.

In some embodiments, in a case where it is determined that another moving body has been coupled to the moving body, the processor outputs the second virtual image to the second wearable device worn by the second wearer who rides in the other moving body coupled to the moving body. This makes it possible for the occupant in the moving body to move while simulating guiding an occupant in another moving body, as a leader, leading to acquisition of a sense of unity between the users.

In some embodiments, the avatar or the hologram image is displayed even when the image is not a real image, making it possible to virtually obtain a sense of unity between the users.

In some embodiments, the processor generates the first virtual image or the second virtual image based on the detection result individually obtained by the first behavior sensor and the second behavior sensor. Accordingly, it is possible to realistically express the behaviors of the first wearer and the second wearer.

In some embodiments, the processor detects the behavior of the first wearer based on the image data detected by the imaging sensor, and generates the second virtual image based on a result of this detection. Accordingly, the behavior of the first wearer in the first virtual image may be realistically expressed.

In some embodiments, since the processor acquires the image data generated by the imaging sensor as the spatial information regarding the internal space and the external space of the moving body, it is possible to realistically represent the first virtual image or the second virtual image.

In some embodiments, the processor controls the projection unit to project the first virtual image and controls the display monitor to display the second virtual image. Accordingly, it is possible to realistically express the first virtual image or the second virtual image.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising
    a processor comprising hardware, the processor being configured to:
    generate a first virtual image when one wearer of a first wearer wearing a first wearable device configured to communicate with the processor and a second wearer wearing a second wearable device configured to communicate with the processor rides in a moving body and another wearer virtually rides in the moving body, the first virtual image reflecting a behavior of the other wearer and representing a state where the other wearer virtually rides in the moving body as observed from a viewpoint of the one wearer, the first virtual image; and
    output the generated first virtual image to the first or the second wearable device worn by the one wearer.

2. The image processing apparatus according to claim 1, wherein the processor is configured to:
    generate a second virtual image representing a state where the one wearer rides in the moving body as observed from a viewpoint of the other wearer, the second virtual image reflecting a behavior of the one wearer and virtually representing an external space of the moving body; and
    output the generated second virtual image to the first or the second wearable device worn by the other wearer.

3. The image processing apparatus according to claim 2, wherein the processor is configured to:
    determine, based on the behavior of the one wearer, whether the one wearer faces a direction in which the other wearer virtually sits in the moving body; and
    generate the first virtual image when determination has been made that the one wearer faces the direction in which the other wearer virtually sits in the moving body.

4. The image processing apparatus according to claim 2, wherein the processor is configured to:
    acquire first identification information for identifying the one wearer, second identification information for identifying the other wearer, and current position information of the moving body,
    acquire action history information based on the position information, the first identification information, and the second identification information from an action history database configured to record the action history information in which an action history of the one wearer linked with the first identification information, an action history of the other wearer linked with the second identification information, and captured images or movies individually taken by the one wearer and the other wearer regarding a place visited in the past are associated with each other; and generate, based on the action history information, each of the first virtual image and the second virtual image representing a part of the external space of the moving body using the captured image or video taken by the at least one of the one wearer or the other wearer at the current position of the moving body.

5. The image processing apparatus according to claim 2, wherein the processor is configured to:

acquire current position information of the moving body and audio data of voice or sound uttered by either one of the one wearer and the other wearer;

determine, based on the audio data, whether one of the one wearer or the other wearer has uttered a name associated with a landmark;

acquire, when determination has been made that one of the one wearer or the other wearer has uttered the name, at least one of current and past landmark images based on the position information and the name uttered by one of the one wearer or the other wearer, from a landmark database configured to record landmark information that has landmark position information indicating a position and a name of a landmark on a map in association with the landmark images including the current and past landmarks; and generate individually the first virtual image and the second virtual image that represent a part of the external space of the moving body by using at least one of the current and past landmark images.

6. The image processing apparatus according to claim 2, wherein the processor is configured to:

in a case where an instruction signal instructing generation of an image of a region-of-interest to be focused in driving operation of the one wearer has been input from the wearable device worn by the other wearer, generate a third virtual image that virtually represents the driving operation of the one wearer in the region-of-interest, based on the instruction signal, spatial information of an internal space of the moving body, and the behavior of the one wearer; and output the generated third virtual image, instead of the second virtual image, to the wearable device worn by the other wearer.

7. The image processing apparatus according to claim 6, wherein the second wearer exists in plurality, and the processor is configured to:

decide a representative from among the plurality of second wearers, generate the first virtual image representing a state where the representative virtually rides in the moving body; and generate the third virtual image in a case where the instruction signal has been input from the second wearable device worn by the representative.

8. The image processing apparatus according to claim 2, wherein the processor is configured to:

determine whether the other wearer rides in a different moving body that differs from the moving body;

acquire individual destinations of the moving body and the different moving body that differs from the moving body in a case where the other wearer rides in the different moving body;

determine whether the individual destinations of the moving body and the different moving body are the same destination; and in a case where the individual destinations of the moving body and the different moving body are the same destination, output the first virtual image to a wearable device worn by the one wearer, and output the second virtual image to the wearable device worn by the other wearer.

9. The image processing apparatus according to claim 8, wherein the processor is configured to:

acquire individual current positions of the moving body and the other moving body; and based on the individual current positions of the moving body and the other moving body, in a case where the other moving body is closer to the destination than from the moving body, output the first virtual image instead of the second virtual image to the wearable device worn by the other wearer, and output the second virtual image instead of the first virtual image to the wearable device worn by the one wearer.

10. The image processing apparatus according to claim 2, wherein the processor is configured to:

determine whether the other wearer rides in a different moving body that differs from the moving body;

in a case where determination has been made that the other wearer rides in the different moving body that differs from the moving body, determine whether the different moving body is coupled to the moving body; and in a case where the determination has been made that the different moving body is coupled to the moving body, output the second virtual image to the wearable device worn by the other wearer.

11. The image processing apparatus according to claim 2, wherein the first virtual image virtually represents the one wearer by using an avatar or a hologram, and the second virtual image virtually represents the other wearer by using an avatar or a hologram.

12. The image processing apparatus according to claim 2, wherein the first wearable device includes a first behavior sensor configured to detect a behavior of the first wearer, the second wearable device includes a second behavior sensor configured to detect a behavior of the second wearer, and the processor is configured to acquire a result of detection performed by the first behavior sensor and a result of detection performed by the second behavior sensor.

13. The image processing apparatus according to claim 2, wherein the moving body includes an imaging sensor configured to image an internal space and generate image data, and the processor is configured to:

acquire the image data generated by the image sensor, detect the behavior of the first wearer based on the image data, and generate the second virtual image based on the behavior of the first wearer.

14. The image processing apparatus according to claim 2, wherein the moving body includes an image sensor configured to image an internal space and an external space and generates image data, and the processor is configured to:

acquire the image data generated by the imaging sensor as spatial information of the internal space of the moving body; and generate the first virtual image and the second virtual image based on the spatial information.

15. The image processing apparatus according to claim 2, wherein the first wearable device includes a projector configured to project the first virtual image toward the one wearer, the second wearable device includes a display monitor configured to display images, and the processor is configured to:

control the projector to project the first virtual image; and control the display monitor to display the second virtual image.

16. The image processing apparatus according to claim 1, wherein the image processing apparatus is provided in the moving body.

17. The image processing apparatus according to claim 1, wherein the image processing apparatus is provided in the first wearable device, the image processing apparatus further comprises a projector configured to project an image toward the first wearer, and the processor is configured to:

generate the first virtual image when the first wearer rides in the moving body and the second wearer virtually rides in the moving body, the first virtual image representing a state where the second wearer virtually rides in the moving body as observed from a viewpoint of the first wearer and reflecting a behavior of the second wearer; and control the projector to project the first virtual image.

18. The image processing apparatus according to claim 1, wherein the image processing apparatus is provided in the second wearable device, the image processing apparatus further comprises a display monitor configured to display images, the processor is configured to:

generate the second virtual image representing a state where the first wearer rides in the moving body as observed from a viewpoint of the second wearer, the second virtual image reflecting a behavior of the first wearer and virtually representing an external space of the moving body; and control the display monitor to display the second virtual image.

19. An image processing apparatus comprising a processor comprising hardware, the processor being configured to:

generates a second virtual image when one wearer of a first wearer wearing a first wearable device configured to communicate with the processor and a second wearer wearing a second wearable device configured to communicate with the processor rides in a moving body and another wearer virtually rides in the moving body, the second virtual image representing a state where the one wearer rides in the moving body as observed from a viewpoint of the other wearer, reflecting a behavior of the one wearer and virtually representing an external space of the moving body; and output the generated second virtual image to the first or the second wearable device worn by the other wearer.

20. A non-transitory computer-readable recording medium on which an executable program is recorded, the program instructing a processor to execute:

generating a first virtual image when one wearer of a first wearer wearing a first wearable device configured to communicate with the processor and a second wearer wearing a second wearable device configured to communicate with the processor rides in a moving body, and another wearer virtually rides in the moving body, the first virtual image representing a state where the other wearer virtually rides in the moving body as observed from a viewpoint of the one wearer and reflecting a behavior of the other wearer, and outputting the first virtual image to the first or the second wearable device worn by the one wearer.

21. A non-transitory computer-readable recording medium on which an executable program is recorded, the program instructing a processor to execute:

generating a second virtual image when one wearer of a first wearer wearing a first wearable device configured to communicate with the processor or a second wearer wearing a second wearable device configured to communicate with the processor rides in a moving body and another wearer virtually rides in the moving body, the second virtual image representing a state where the one wearer rides in the moving body as observed from a viewpoint of the other wearer, reflecting a behavior of the one wearer and virtually representing an external space of the moving body; and outputting the generated second virtual image to the first or the second wearable device worn by the other wearer.

* * * * *